(12) United States Patent  (10) Patent No.: US 7,957,612 B1
Ohba  (45) Date of Patent: Jun. 7, 2011

(54) IMAGE PROCESSING DEVICE, METHOD AND DISTRIBUTION MEDIUM

(75) Inventor: Akio Ohba, Tokyo (JP)

(73) Assignee: Sony Computer Entertainment Inc., Tokyo (JP)

( * ) Notice: Subject to any disclaimer, the term of this patent is extended or adjusted under 35 U.S.C. 154(b) by 0 days.

(21) Appl. No.: 09/315,713

(22) Filed: May 20, 1999

(30) Foreign Application Priority Data

May 20, 1998 (JP) ................................. P10-138043

(51) Int. Cl.
*G06K 9/54* (2006.01)
*G06K 9/40* (2006.01)
*G06F 13/00* (2006.01)

(52) U.S. Cl. ...................... 382/305; 345/536; 382/260
(58) Field of Classification Search ................. 382/305, 382/279, 281, 295, 296, 300, 260; 345/418, 345/419, 441, 582, 544, 423, 522, 530, 541, 345/425, 583, 536, 543; 707/1, 100
See application file for complete search history.

(56) References Cited

U.S. PATENT DOCUMENTS

| | | | |
|---|---|---|---|
| 5,526,471 A | 6/1996 | Tannenbaum et al. | |
| 5,581,673 A * | 12/1996 | Kikuchi | 345/423 |
| 5,630,043 A | 5/1997 | Uhlin | |
| 5,757,374 A * | 5/1998 | Nakamura et al. | 345/425 |
| 5,838,332 A * | 11/1998 | Penna et al. | 345/430 |
| 5,864,639 A * | 1/1999 | Chao | 382/293 |
| 5,986,659 A * | 11/1999 | Gallery et al. | 345/419 |
| 6,031,550 A * | 2/2000 | Larson | 345/511 |
| 6,151,035 A * | 11/2000 | Okada | 345/509 |
| 6,172,684 B1 * | 1/2001 | Lapidous | 345/443 |
| 6,246,414 B1 * | 6/2001 | Kawasaki | 5/419 |

FOREIGN PATENT DOCUMENTS

| | | |
|---|---|---|
| JP | 62-251973 | 11/1987 |
| JP | 1-073469 | 3/1989 |
| JP | 1-131976 | 5/1989 |
| JP | 4-205573 | 7/1992 |
| JP | 4-233672 | 8/1992 |
| JP | 4-317184 | 11/1992 |
| JP | 6-150017 | 5/1994 |
| JP | 6-161876 | 6/1994 |
| JP | 7-328228 | 12/1995 |
| JP | 8-129647 | 5/1996 |
| JP | 8-161511 | 6/1996 |
| JP | 9-166975 | 6/1997 |
| JP | 10-11610 | 1/1998 |

OTHER PUBLICATIONS

Japanese Office Action dated May 7, 2008, from the corresponding Japanese Application.
Notice of Rejection Reasons mailed May 30, 2006.

(Continued)

*Primary Examiner* — Bhavesh M. Mehta
*Assistant Examiner* — Kanji Patel
(74) *Attorney, Agent, or Firm* — Katten Muchin Rosenman LLP

(57) ABSTRACT

A device and method and a distribution medium for performing image processing with a low-cost are provided, in which a main CPU issues instructions to a rendering engine to perform convolution filtering operations using rendering commands. In response to these instructions, the rendering engine repeatedly executes a process by which values calculated by computing convolution filter coefficients on the image data of the texture area of an image memory are overwritten in the rendering area, and thereby executes convolution filtering.

27 Claims, 43 Drawing Sheets

OTHER PUBLICATIONS

OpenGL Programming Guide The Official Guide to Learning OpenGL, Release 1, written by OpenGL ARB, Published by Addison Wesley Publishers, Japan Lit., Nov. 20, 1995, pp. 318-324.

Notice of Decision to Reject mailed Sep. 30, 2006, from corresponding Japanese Application 2000-550064.

Supplementary Partial European Search Report dated Nov. 2, 2006, from corresponding European Application 99921180.8-2218.

P. Erhan Eren et al. "Special Effects Authoring Using 2-d Mesh Models" Image Processing, 1997 IEEE Comput. Soc., vol. 1, Oct. 26, 1997, pp. 723-726, XP010254273.

S. Vigneaux et al. "A Real-Time Video Mapping and Manipulation System" SMPTE Journal, vol. 100, No. 3, Mar. 1, 1991, pp. 162-166, XP000178490.

Ali J. Azarbayejani et al. "Recursive Estimation for CAD Model Recovery" IEEE Comput. Soc., 1994, pp. 90-97, XP002402870.

Utz Osterfeld, et al. "Real-Time Video Processing and Video Texture Generation" Proceedings of SPIE, vol. 2298, 1994, pp. 362-372, XP009036991.

* cited by examiner $c_{sp}$ i

```
        0    1    2    3    4  HMAX-1
     0
     1
     2
  j
     3
     4
VMAX-1
```

$c_{sp}$ 0   1   2   3   4   5 (HMAX-1)

j

0

1

2

3

4

5 (VMAX-1)

FIG. 10

|   | 0 | 1 | 2 |
|---|---|---|---|
| 0 | $C_{00}$ (1,1) | $C_{01}$ (0,1) | $C_{02}$ (-1,1) |
| 1 | $C_{10}$ (1,0) | $C_{11}$ (0,0) | $C_{12}$ (-1,0) |
| 2 | $C_{20}$ (1,-1) | $C_{21}$ (0,-1) | $C_{22}$ (-1,-1) |

CONVOLUTION FILTER COEFFICIENT

|   | 0 | 1 | 2 | 3 | 4 | 5 (HMAX−1) |
|---|---|---|---|---|---|---|
| 0 |   |   |   |   |   |   |
| 1 |   | 0 | 0 | 0 | 0 | 0 |
| 2 |   | 0 | 0 | 0 | 0 | 0 |
| 3 |   | 0 | 0 | 0 | 0 | 0 |
| 4 |   | 0 | 0 | 0 | 0 | 0 |
| 5 (VMAX−1) |   | 0 | 0 | 0 | 0 | 0 | j

FIG. 13

|   | $C_{dp}$ | | | | | |
|---|---|---|---|---|---|---|
| $j$ | 0 | 1 | 2 | 3 | 4 | 5 (HMAX−1) |
| 0 |   |   |   |   |   |   |
| 1 |   | $C_{sp00}XC_{00}$ | $C_{sp10}XC_{00}$ | $C_{sp20}XC_{00}$ | $C_{sp30}XC_{00}$ | $C_{sp40}XC_{00}$ |
| 2 |   | $C_{sp01}XC_{00}$ | $C_{sp11}XC_{00}$ | $C_{sp21}XC_{00}$ | $C_{sp31}XC_{00}$ | $C_{sp41}XC_{00}$ |
| 3 |   | $C_{sp02}XC_{00}$ | $C_{sp12}XC_{00}$ | $C_{sp22}XC_{00}$ | $C_{sp32}XC_{00}$ | $C_{sp42}XC_{00}$ |
| 4 |   | $C_{sp03}XC_{00}$ | $C_{sp13}XC_{00}$ | $C_{sp23}XC_{00}$ | $C_{sp33}XC_{00}$ | $C_{sp43}XC_{00}$ |
| 5 (VMAX−1) |   | $C_{sp04}XC_{00}$ | $C_{sp14}XC_{00}$ | $C_{sp24}XC_{00}$ | $C_{sp34}XC_{00}$ | $C_{sp44}XC_{00}$ |

FIG. 14

|   | $C_{dp}$ | | | | | |
|---|---|---|---|---|---|---|
| j | 0 | 1 | 2 | 3 | 4 | 5 (HMAX−1) |
| 0 | | | | | | |
| 1 | | $C_{sp00}XC_{00}$ $+C_{sp10}XC_{10}$ | $C_{sp10}XC_{00}$ $+C_{sp20}XC_{10}$ | $C_{sp20}XC_{00}$ $+C_{sp30}XC_{10}$ | $C_{sp30}XC_{00}$ $+C_{sp40}XC_{10}$ | $C_{sp40}XC_{00}$ $+C_{sp50}XC_{10}$ |
| 2 | | $C_{sp01}XC_{00}$ $+C_{sp11}XC_{10}$ | $C_{sp11}XC_{00}$ $+C_{sp21}XC_{10}$ | $C_{sp21}XC_{00}$ $+C_{sp31}XC_{10}$ | $C_{sp31}XC_{00}$ $+C_{sp41}XC_{10}$ | $C_{sp41}XC_{00}$ $+C_{sp51}XC_{10}$ |
| 3 | | $C_{sp02}XC_{00}$ $+C_{sp12}XC_{10}$ | $C_{sp12}XC_{00}$ $+C_{sp22}XC_{10}$ | $C_{sp22}XC_{00}$ $+C_{sp32}XC_{10}$ | $C_{sp32}XC_{00}$ $+C_{sp42}XC_{10}$ | $C_{sp42}XC_{00}$ $+C_{sp52}XC_{10}$ |
| 4 | | $C_{sp03}XC_{00}$ $+C_{sp13}XC_{10}$ | $C_{sp13}XC_{00}$ $+C_{sp23}XC_{10}$ | $C_{sp23}XC_{00}$ $+C_{sp33}XC_{10}$ | $C_{sp33}XC_{00}$ $+C_{sp43}XC_{10}$ | $C_{sp43}XC_{00}$ $+C_{sp53}XC_{10}$ |
| 5 (VMAX−1) | | $C_{sp04}XC_{00}$ $+C_{sp14}XC_{10}$ | $C_{sp14}XC_{00}$ $+C_{sp24}XC_{10}$ | $C_{sp24}XC_{00}$ $+C_{sp34}XC_{10}$ | $C_{sp34}XC_{00}$ $+C_{sp44}XC_{10}$ | $C_{sp44}XC_{00}$ $+C_{sp54}XC_{10}$ |

FIG. 15

| | $C_{dp}$ | | | | | |
|---|---|---|---|---|---|---|
| | 0 | 1 | 2 | 3 | 4 | 5 (HMAX−1) |
| 0 | | | | | | |
| 1 | | $C_{sp00}XC_{00}$ $+C_{sp10}XC_{10}$ $+C_{sp20}XC_{20}$ | $C_{sp10}XC_{00}$ $+C_{sp20}XC_{10}$ $+C_{sp30}XC_{20}$ | $C_{sp20}XC_{00}$ $+C_{sp30}XC_{10}$ $+C_{sp40}XC_{20}$ | $C_{sp30}XC_{00}$ $+C_{sp40}XC_{10}$ $+C_{sp50}XC_{20}$ | $C_{sp40}XC_{00}$ $+C_{sp50}XC_{10}$ |
| 2 | | $C_{sp01}XC_{00}$ $+C_{sp11}XC_{10}$ $+C_{sp21}XC_{20}$ | $C_{sp11}XC_{00}$ $+C_{sp21}XC_{10}$ $+C_{sp31}XC_{20}$ | $C_{sp21}XC_{00}$ $+C_{sp31}XC_{10}$ $+C_{sp41}XC_{20}$ | $C_{sp31}XC_{00}$ $+C_{sp41}XC_{10}$ $+C_{sp51}XC_{20}$ | $C_{sp41}XC_{00}$ $+C_{sp51}XC_{10}$ |
| 3 | | $C_{sp02}XC_{00}$ $+C_{sp12}XC_{10}$ $+C_{sp22}XC_{20}$ | $C_{sp12}XC_{00}$ $+C_{sp22}XC_{10}$ $+C_{sp32}XC_{20}$ | $C_{sp22}XC_{00}$ $+C_{sp32}XC_{10}$ $+C_{sp42}XC_{20}$ | $C_{sp32}XC_{00}$ $+C_{sp42}XC_{10}$ $+C_{sp52}XC_{20}$ | $C_{sp42}XC_{00}$ $+C_{sp52}XC_{10}$ |
| 4 | | $C_{sp03}XC_{00}$ $+C_{sp13}XC_{10}$ $+C_{sp23}XC_{20}$ | $C_{sp13}XC_{00}$ $+C_{sp23}XC_{10}$ $+C_{sp33}XC_{20}$ | $C_{sp23}XC_{00}$ $+C_{sp33}XC_{10}$ $+C_{sp43}XC_{20}$ | $C_{sp33}XC_{00}$ $+C_{sp43}XC_{10}$ $+C_{sp53}XC_{20}$ | $C_{sp43}XC_{00}$ $+C_{sp53}XC_{10}$ |
| 5 (VMAX−1) | | $C_{sp04}XC_{00}$ $+C_{sp14}XC_{10}$ $+C_{sp24}XC_{20}$ | $C_{sp14}XC_{00}$ $+C_{sp24}XC_{10}$ $+C_{sp34}XC_{20}$ | $C_{sp24}XC_{00}$ $+C_{sp34}XC_{10}$ $+C_{sp44}XC_{20}$ | $C_{sp34}XC_{00}$ $+C_{sp44}XC_{10}$ $+C_{sp54}XC_{20}$ | $C_{sp44}XC_{00}$ $+C_{sp54}XC_{10}$ |

(row label: j)

| | 0 | 1 | 2 | 3 | 4 | 5 (HMAX−1) |
|---|---|---|---|---|---|---|
| 0 | | | | | | |
| 1 | | $C_{sp00}XC_{00}$ $+C_{sp10}XC_{10}$ $+C_{sp20}XC_{20}$ $+C_{sp01}XC_{01}$ | $C_{sp10}XC_{00}$ $+C_{sp20}XC_{10}$ $+C_{sp30}XC_{20}$ $+C_{sp11}XC_{01}$ | $C_{sp20}XC_{00}$ $+C_{sp30}XC_{10}$ $+C_{sp40}XC_{20}$ $+C_{sp21}XC_{01}$ | $C_{sp30}XC_{00}$ $+C_{sp40}XC_{10}$ $+C_{sp50}XC_{20}$ $+C_{sp31}XC_{01}$ | $C_{sp40}XC_{00}$ $+C_{sp50}XC_{10}$ $+C_{sp41}XC_{01}$ |
| 2 | | $C_{sp01}XC_{00}$ $+C_{sp11}XC_{10}$ $+C_{sp21}XC_{20}$ $+C_{sp02}XC_{01}$ | $C_{sp11}XC_{00}$ $+C_{sp21}XC_{10}$ $+C_{sp31}XC_{20}$ $+C_{sp12}XC_{01}$ | $C_{sp21}XC_{00}$ $+C_{sp31}XC_{10}$ $+C_{sp41}XC_{20}$ $+C_{sp22}XC_{01}$ | $C_{sp31}XC_{00}$ $+C_{sp41}XC_{10}$ $+C_{sp51}XC_{20}$ $+C_{sp32}XC_{01}$ | $C_{sp41}XC_{00}$ $+C_{sp51}XC_{10}$ $+C_{sp42}XC_{01}$ |
| 3 | | $C_{sp02}XC_{00}$ $+C_{sp12}XC_{10}$ $+C_{sp22}XC_{20}$ $+C_{sp03}XC_{01}$ | $C_{sp12}XC_{00}$ $+C_{sp22}XC_{10}$ $+C_{sp32}XC_{20}$ $+C_{sp13}XC_{01}$ | $C_{sp22}XC_{00}$ $+C_{sp32}XC_{10}$ $+C_{sp42}XC_{20}$ $+C_{sp23}XC_{01}$ | $C_{sp32}XC_{00}$ $+C_{sp42}XC_{10}$ $+C_{sp52}XC_{20}$ $+C_{sp33}XC_{01}$ | $C_{sp42}XC_{00}$ $+C_{sp52}XC_{10}$ $+C_{sp43}XC_{01}$ |
| 4 | | $C_{sp03}XC_{00}$ $+C_{sp13}XC_{10}$ $+C_{sp23}XC_{20}$ $+C_{sp04}XC_{01}$ | $C_{sp13}XC_{00}$ $+C_{sp23}XC_{10}$ $+C_{sp33}XC_{20}$ $+C_{sp14}XC_{01}$ | $C_{sp23}XC_{00}$ $+C_{sp33}XC_{10}$ $+C_{sp43}XC_{20}$ $+C_{sp24}XC_{01}$ | $C_{sp33}XC_{00}$ $+C_{sp43}XC_{10}$ $+C_{sp53}XC_{20}$ $+C_{sp34}XC_{01}$ | $C_{sp43}XC_{00}$ $+C_{sp53}XC_{10}$ $+C_{sp44}XC_{01}$ |
| 5 (VMAX−1) | | $C_{sp04}XC_{00}$ $+C_{sp14}XC_{10}$ $+C_{sp24}XC_{20}$ $+C_{sp05}XC_{01}$ | $C_{sp14}XC_{00}$ $+C_{sp24}XC_{10}$ $+C_{sp34}XC_{20}$ $+C_{sp15}XC_{01}$ | $C_{sp24}XC_{00}$ $+C_{sp34}XC_{10}$ $+C_{sp44}XC_{20}$ $+C_{sp25}XC_{01}$ | $C_{sp34}XC_{00}$ $+C_{sp44}XC_{10}$ $+C_{sp54}XC_{20}$ $+C_{sp35}XC_{01}$ | $C_{sp44}XC_{00}$ $+C_{sp54}XC_{10}$ $+C_{sp45}XC_{01}$ | j

|   | $C_{dp}$ | | | | | |
|---|---|---|---|---|---|---|
| j | 0 | 1 | 2 | 3 | 4 | 5 (HMAX−1) |
| 0 | | | | | | |
| 1 | | $\frac{CMAX}{2}$ | $\frac{CMAX}{2}$ | $\frac{CMAX}{2}$ | $\frac{CMAX}{2}$ | $\frac{CMAX}{2}$ |
| 2 | | $\frac{CMAX}{2}$ | $\frac{CMAX}{2}$ | $\frac{CMAX}{2}$ | $\frac{CMAX}{2}$ | $\frac{CMAX}{2}$ |
| 3 | | $\frac{CMAX}{2}$ | $\frac{CMAX}{2}$ | $\frac{CMAX}{2}$ | $\frac{CMAX}{2}$ | $\frac{CMAX}{2}$ |
| 4 | | $\frac{CMAX}{2}$ | $\frac{CMAX}{2}$ | $\frac{CMAX}{2}$ | $\frac{CMAX}{2}$ | $\frac{CMAX}{2}$ |
| 5 (VMAX−1) | | $\frac{CMAX}{2}$ | $\frac{CMAX}{2}$ | $\frac{CMAX}{2}$ | $\frac{CMAX}{2}$ | $\frac{CMAX}{2}$ |

| 0 | -1 | 0 |
|---|----|---|
| -1 | 4 | -1 |
| 0 | -1 | 0 |

(B)

| -1 | -1 | -1 |
|----|----|----|
| -1 | 8 | -1 |
| -1 | -1 | -1 |

(C)

| -1/4 | -1/4 | -1/4 |
|------|------|------|
| -1/4 | 2 | -1/4 |
| -1/4 | -1/4 | -1/4 |

(D)

| -1/8 | -1/8 | -1/8 |
|------|------|------|
| -1/8 | 1 | -1/8 |
| -1/8 | -1/8 | -1/8 |

FIG. 50

IMAGE PROCESSING DEVICE, METHOD AND DISTRIBUTION MEDIUM

BACKGROUND OF THE INVENTION

1. Field of the Invention

The present invention relates to an image processing device, image processing method and distribution medium, and particularly to an image processing device and method, and distribution medium that are low-cost wherein the device has a simple construction which is able to perform image processing.

2. Description of the Prior Art

FIG. 1 shows a sample configuration of an image processing device. Video camera 1 photographs a subject, which is not illustrated, and outputs the image data of that subject to image processor 2 and CPU 5. Image processor 2 stores the image data that was input from video camera 1 memory 11. If CPU 5 instructs arithmetic unit 12 of image processor 2 to perform a stipulated operation, arithmetic unit 12 applies the stipulated operation corresponding to this instruction to the image data stored in memory 11 and outputs the resulting computation data to the graphics processor 3.

Graphics processor 3 stores the computation data that was input from image processor 2 in memory 21. CPU 5 controls display data generator 22 of graphics processor 3 to generate display data from the computation data stored in memory 21. The display data that was generated in graphics processor 3 is output and displayed on CRT 4.

CPU 5 also receives a supply of data that is output from video camera 1 or image processor 2, executes stipulated processing as necessary, and outputs the data to image processor 2 or graphics processor 3.

If, for example, this kind of image processing device were to perform processing that applied convolution filtering to the image data that was output from video camera 1 and output the result to CRT 4 for display, the operation at this time would be, for example, as shown in the flowchart in FIG. 2. This processing is basically executed by CPU 5.

In step S1, CPU 5 receives a supply of image data corresponding to one frame from video camera 1. This image data, which can be considered as the source frame image data, consists of an HMAX, VMAX array of pixel data $C_{sp}$ as shown, for example, in FIG. 3. In step S1, CPU 5 also sets the convolution filter coefficients $C_v[m][n]$. In the example in FIG. 4, these convolution filter coefficients $C_v[m][n]$ consist of a 3×3 array of coefficients.

Next, in step S2, CPU 5 assumes an HMAX VMAX array of pixel data as destination frame pixel data $C_{dp}$, as shown in FIG. 5, and initializes the value of pixel data $C_{dp}[1][1]$ corresponding to coordinate (1,1) among them to 0. In addition, CPU 5 initializes variable j to 1 in step S3 and variable i to 1 in step S4. The variables i and j represent the horizontal coordinate (i) and vertical coordinate (j) of the source frame image (FIG. 3) and destination frame image (FIG. 5), as shown in FIG. 3 and FIG. 5. Variable i takes the values from 0 to HMAX-1, and variable j takes the values from 0 to VMAX-1.

In steps S5 and S6, the variables n and m are each initialized to 0. The variables n and m represent the horizontal coordinate (m) and vertical coordinate (n) of the convolution filter coefficients, as shown in FIG. 4. In this example, m and n each take the values from 0 to 2.

Next, in step S7, CPU 5 executes the computation indicated by the following equation.

$$C_{dp}[i][j]=C_{dp}[i][j]+C_v[m][n]*C_{SP}[i+m-1][j+n-1] \quad (1)$$

Now, since j=1, i=1, n=0, and m=0 have been set and the initial value of $C_{dp}[i][j]$ has been set to 0, the following equation can be obtained.

$$C_{dp}[1][1]=C_v[0][0]*C_{SP}[0][0] \quad (2)$$

Next, processing advances to step S8, and CPU 5 judges whether or not variable m is less than 2. Since m=0 at this time, it is less than 2. Therefore, processing advances to step S9 where m is incremented by 1. At this time, m=1. Processing then returns to step S7, and equation (1) is computed again. The following equation is obtained as the result.

$$C_{dp}[1][1]=C_{dp}[1][1]+C_v[1][0]*C_{SP}[1][0] \quad (3)$$

Here, the value of $C_{dp}[1][1]$ on the right hand side of equation (3) is the value obtained by using equation (2).

Processing advances to step S8, and CPU 5 again judges whether or not variable m is less than 2. Since m=1 at this time, processing advances to step S9 where m is incremented by 1. At this time, m=2. Then, processing returns to step S7, and equation (1) is computed again.
The following equation is obtained as the result.

$$C_{dp}[1][1]=C_{dp}[1][1]+C_v[2][0]*C_{SP}[2][0] \quad (4)$$

The processing described above results in a value that is the sum of the products obtained by multiplying the convolution filter coefficients $C_v[0][0]$, $C_v[1][0]$, and $C_v[2][0]$ by the source pixel data $C_{SP}[0][0]$, $C_{SP}[1][0]$, and $C_{SP}[2][0]$, respectively.

Next, processing advances to step S8, and CPU 5 judges whether or not variable m is less than 2. Since m=2 at this time, the judgment result is NO, and processing advances to step S10. In step S10, CPU 5 judges whether or not variable n is less than 2. Since n=0 at this time, the judgment result is YES, and processing advances to step S11. In step S11, variable n is incremented by 1. At this time, n=1.

Then, after processing returns to step S6 where m is initialized to m=0, equation (1) is computed again in step S7. The following equation is obtained as the result.

$$C_{dp}[1][1]=C_{dp}[1][1]+C_v[0][1]*C_{SP}[0][1] \quad (5)$$

Next, processing advances to step S8, and CPU 5 judges whether or not variable m is less than 2. Since m=0 at this time, the judgment result is YES, and m is set to m=1 in step S9. Then, processing returns to step S7, and equation (1) is computed again. Equation (6) is obtained as the result.

$$C_{dp}[1][1]=C_{dp}[1][1]+C_v[1][1]*C_{SP}[1][1] \quad (6)$$

The above processing is repeated, and the equations (7) to (10) shown below are computed as the results.

$$C_{dp}[1][1]=C_{dp}[1][1]+C_v[2][1]*C_{SP}[2][1] \quad (7)$$

$$C_{dp}[1][1]=C_{dp}[1][1]+C_v[0][2]*C_{SP}[0][2] \quad (8)$$

$$C_{dp}[1][1]=C_{dp}[1][1]+C_v[1][2]*C_{SP}[1][2] \quad (9)$$

$$C_{dp}[1][1]=C_{dp}[1][1]+C_v[2][2]*C_{SP}[2][2] \quad (10)$$

This completes convolution filtering in which the single pixel data $C_{SP}[1][1]$ is the subject pixel.

Since n=2 in step S10 at this time, the judgment result is NO, and processing proceeds to step S12. In step S12, CPU 5 judges whether or not variable i is less than HMAX-2 (in this example, since HMAX=6, CPU 5 judges whether or not variable i is less than HMAX-2=4). Since i=1 at this time, it is less than HMAX-2, and the judgment result is YES. Processing advances to step S13 where variable i is incremented by 1. At this time, i=2. Then, processing returns to step S5, and the subsequent processing is executed. That is, convolution filtering in which the pixel data $C_{SP}[2][1]$ is the subject pixel is executed in a similar manner as described for convolution filtering in which pixel data $C_{SP}[1][1]$ is the subject pixel.

Convolution filtering is performed sequentially for each pixel data in row j=1. When pixel data $C_{SP}[1][HMAX-2]$ (for the example in FIG. 3, this is $C_{SP}[1][4]$) is reached, the judgment result in step S12 is NO, and processing advances to step S14. In step S14, CPU 5 judges whether or not variable j is less than VMAX-2 (in this example, since VMAX=6, CPU 5 judges whether or not variable j is less than VMAX-2=4). Since j=1 at this time, the judgment result is YES. Processing advances to step S15 where variable j is incremented by 1. At this time, j=2. Then, processing returns to step S4, and the subsequent processing is executed. That is, convolution filtering is executed for each pixel data in row j=2 in a similar manner as described above.

When the convolution filter coefficient computation is completed as described above for the source pixel data $C_{SP}$[HMAX-2][VMAX-2] in the column for which i is HMAX-2 of the row in which j is VMAX-2, the judgment result is NO in step S14, and convolution filtering is completed.

CPU 5 supplies the data for the computation results obtained as described above to graphics processor 3. Graphics processor 3 stores the image data corresponding to one frame, which was input from CPU 5, in memory 21. Display data generator 22 transforms this image data to display data and outputs it to CRT 4 for display.

Although it was assumed in the above description that convolution filtering was executed by CPU 5, it can also be executed by image processor 2. Additionally, special-purpose hardware for executing this kind of processing can be provided separately, and this processing can also be executed by that hardware.

SUMMARY OF THE INVENTION

In an image processing device as described above, it is assumed that stipulated operations will be performed by CPU 5, image processor 2, or special-purpose hardware. As a result, there are problems in that either the processing load for CPU 5 or image processor 2 will increase, or special-purpose hardware will be required, which will not only cause the configuration to become more complex but will also cause the cost to increase.

It is an object of the present invention to provide a low-cost device with a simple construction that is able to perform image processing.

This and other objects of the present invention are attained by an image processing device which comprises a first storage means that stores source image data in units of pixels; a second storage means that stores destination image data in units of pixels; and a rendering means that performs the action of applying a stipulated pixel-unit operation to the source image data stored in the first storage means and rendering the data as destination image data in the second storage means in units of polygons repeatedly until a stipulated arithmetic result is obtained.

The image processing method of the present invention comprises a rendering step wherein the action of applying a stipulated pixel-unit operation to the source image data stored in the first storage means and rendering the data as destination image data in the second storage means of the image processing device in units of polygons is performed repeatedly until a stipulated arithmetic result is obtained.

The distribution medium in an image processing device including a first storage means that stores source-image image data in units of pixels, and a second storage means that stores destination image data in units of pixels, is used to distribute a program that executes processing and comprises a rendering step wherein the action of applying a stipulated pixel-unit operation to the source image data stored in the first storage means and rendering the data as destination image data in the second storage means in units of polygons is performed repeatedly until a stipulated arithmetic result is obtained.

The image processing device of another embodiment comprises storage means comprising a first storage unit that stores source image data in units of pixels and a second storage unit that stores destination image data in units of pixels; a generation means that generates rendering commands that cause the action of applying a stipulated pixel-unit operation to the source image data stored in the first storage unit and rendering the data as destination image data in the second storage unit in units of polygons to be performed repeatedly until a stipulated arithmetic result is obtained; and an execution means that executes rendering commands generated by the generation means.

The image processing method of the present invention may comprise a storage step wherein source image data is stored in a first storage unit in units of pixels and also destination image data is stored in a second storage unit in units of pixels; and a generation step for generating rendering commands that cause the action of applying a stipulated pixel-unit operation to the source image data stored in the first storage means in the storage step and rendering the data as destination image data in the second storage means in units of polygons to be performed repeatedly until a stipulated arithmetic result is obtained.

In an embodiment, the distribution medium used to distribute a program that executes processing includes a storage step wherein source image data is stored in a first storage unit of the device in units of pixels and also destination image data is stored in a second storage unit of the image processing device in units of pixels, and a generation step for generating rendering commands that cause the action of applying a stipulated pixel-unit operation to the source image data stored in the first storage unit in the storage step and rendering the data as destination image data in the second storage unit in units of polygons to be performed repeatedly until a stipulated arithmetic result is obtained.

In an embodiment the image processing device comprises a first storage means that stores source image data in units of pixels; a second storage means that stores destination image data in units of pixels; a first rendering means that performs one portion of the operations among some stipulated pixel-unit operations to the source image data stored in the first storage means and renders the data as destination image data in the second storage means in units of polygons; and a second rendering means that performs another portion of the operations among some stipulated pixel-unit operations to the source image data stored in the first storage means, adds or subtracts this data to or from the image data already rendered by the first rendering means and renders the data as destination image data in the second storage means in units of polygons.

In another embodiment the image processing process comprises a first rendering step wherein one portion of the operations among some stipulated pixel-unit operations are performed on the source image data stored in the first storage means and the data is rendered as destination image data in the second storage means in units of polygons; and a second rendering step wherein another portion of the operations among some stipulated pixel-unit operations are performed on the source image data stored in the first storage means, this data is added to or subtracted from the image data already rendered in the first rendering step and the data is rendered as destination image data in the second storage means in units of polygons.

The distribution medium is used to distribute a program that executes processing may include a first rendering step wherein one portion of the operations among some stipulated pixel-unit operations are performed on the source image data stored in the first storage means and the data is rendered as destination image data in the second storage means in units of polygons; and a second rendering step wherein another portion of the operations among some stipulated pixel-unit operations are performed on the source image data stored in the first storage means, this data is added to or subtracted from the image data already rendered in the first rendering step and the data is rendered as destination image data in the second storage means in units of polygons.

In the image processing device of this invention, the image processing method and the distribution medium, the action of applying a stipulated pixel-unit operation to the source image data stored in the first storage means and rendering the data as destination image data in the second storage means in units of polygons is performed repeatedly until a stipulated arithmetic result is obtained.

In the image processing device, the image processing process and the distribution medium of the invention, there are generated rendering commands that cause the action of applying a stipulated pixel-unit operation to the source image data stored in the first storage means and rendering the data as destination image data in the second storage means in units of polygons to be performed repeatedly until a stipulated arithmetic result is obtained.

In the image processing device, the image processing process and the distribution medium, one portion of the operations among some stipulated pixel-unit operations may be performed on the source image data stored in the first storage means and the data is rendered as destination image data in the second storage means in units of polygons, and then another portion of the operations among some stipulated pixel-unit operations may be performed on the source image data stored in the first storage means, this data is added to or subtracted from the image data already rendered in the first rendering step and the data is rendered as destination image data in the second storage means in units of polygons.

BRIEF DESCRIPTION OF THE DRAWINGS

FIG. 3 is a diagram used to explain the source image data;

FIG. 4 is a diagram used to explain the convolution filter coefficients;

FIG. 10 is a diagram used to explain the source image data;

FIG. 11 is a diagram used to explain the convolution filter coefficients;

FIG. 13 is a diagram used to explain the destination image data;

FIG. 14 is a diagram used to explain the destination image data;

FIG. 15 is a diagram used to explain the destination image data;

FIG. 16 is a diagram used to explain the destination image data;

FIG. 17 is a diagram used to explain the destination image data;

FIG. 18 is a diagram used to explain the destination image data;

FIG. 21 is a diagram used to explain the destination image data in step S53 of FIG. 19;

FIG. 50 is a diagram showing an example of filter coefficients in the case that the edge extraction process is performed.

DETAILED DESCRIPTION OF THE PREFERRED EMBODIMENTS

Figure 1:
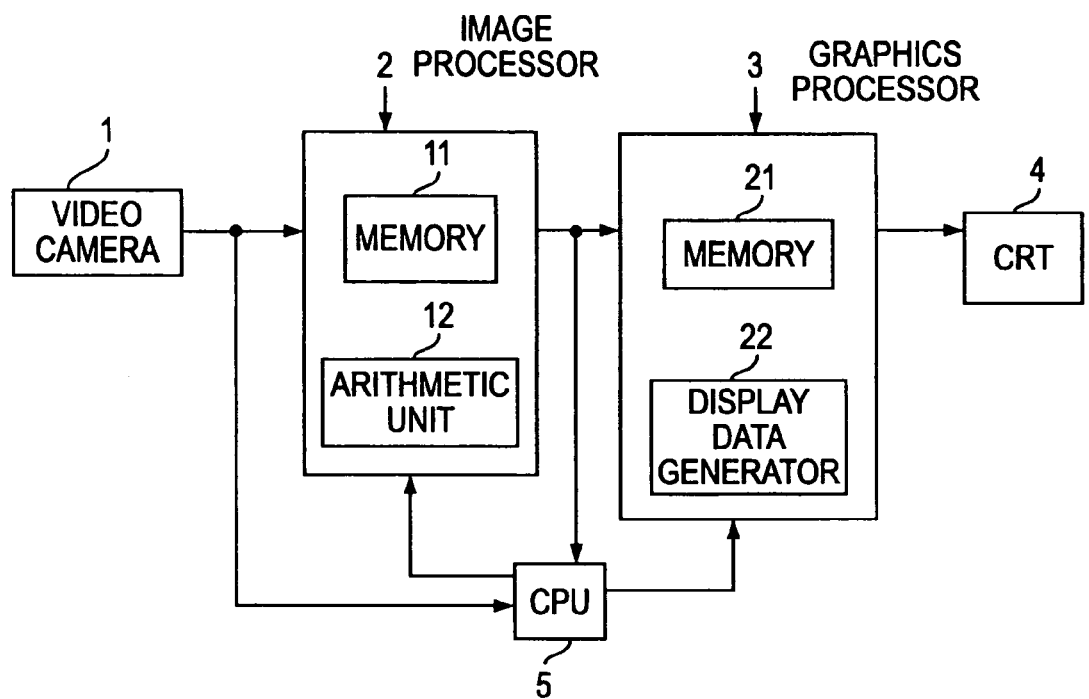
FIG. 1 is a block diagram showing an example of the configuration of a conventional image processing device.
Figure 2:
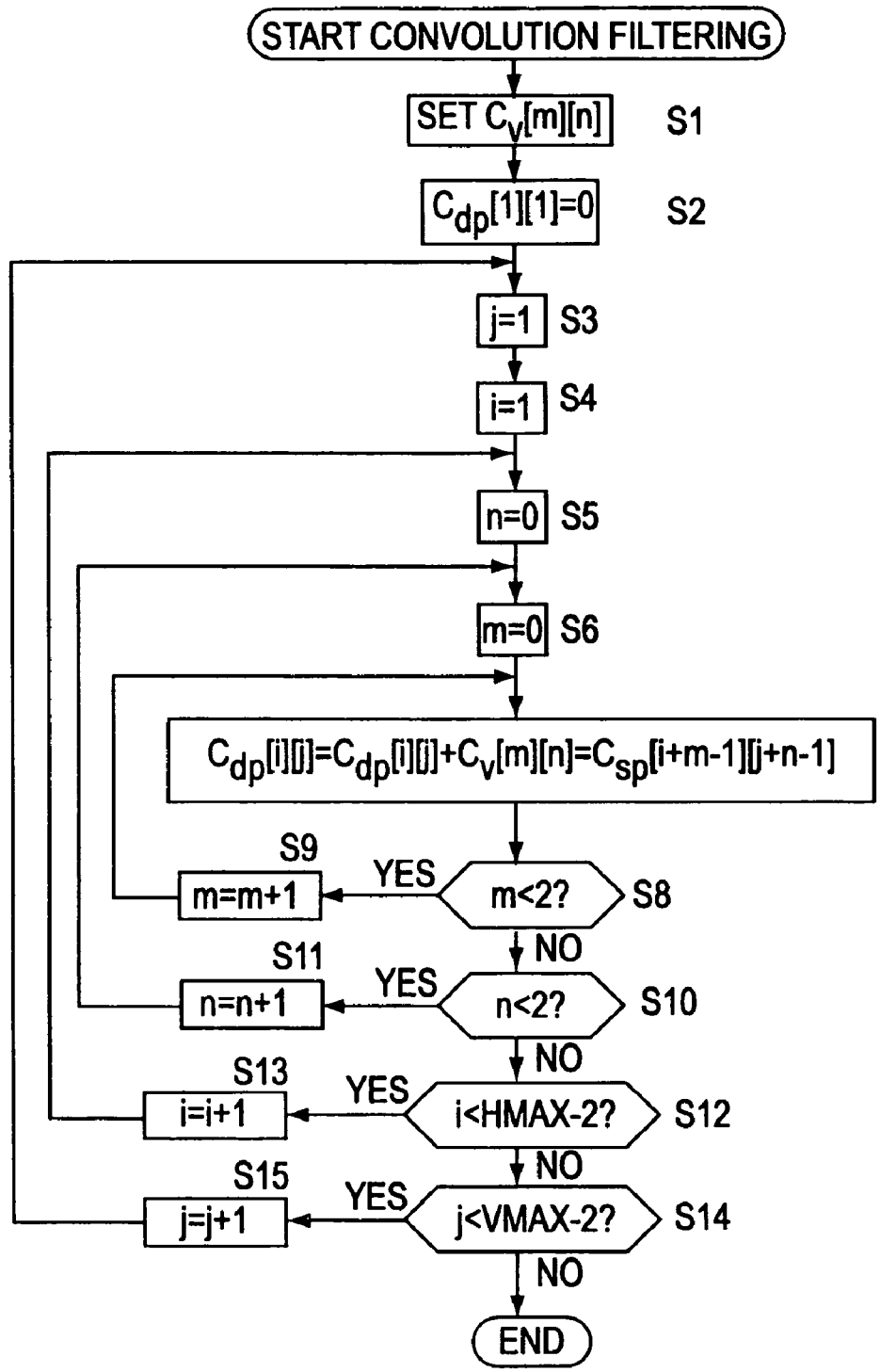
FIG. 2 is a flowchart used to explain conventional convolution filtering.
Figure 5:
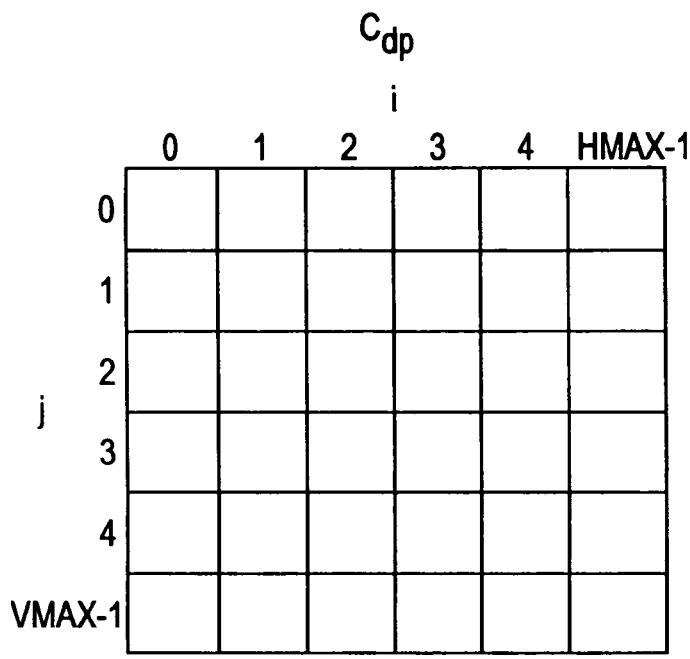
FIG. 5 is a diagram used to explain the destination image data.
Figure 6:
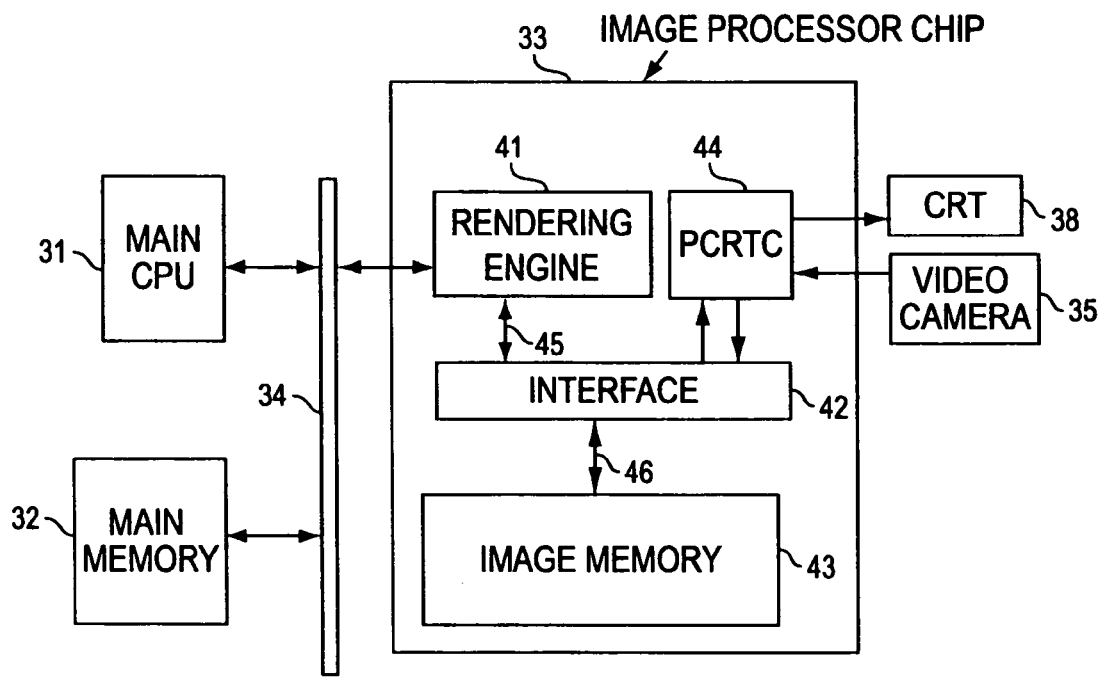
FIG. 6 is a block diagram showing an example of the configuration of an image processing device according to the present invention.

FIG. 6 is a block diagram specifically showing the configuration of a computer entertainment device in which the image processing device of this invention is applied. Main memory 32 and image processing chip 33 are connected to main CPU 31 via bus 34. Main CPU 31 generates rendering commands to control the operation of image processing chip 33. The programs or data that are required when main CPU 31 executes various types of processing are stored appropriately in main memory 32.

Rendering engine 41 of image processing chip 33 executes operations for rendering stipulated image data in image memory 43 via memory interface 42 according to rendering commands supplied from main CPU 31. Bus 45 is connected between memory interface 42 and rendering engine 41, and bus 46 is connected between memory interface 42 and image memory 43. Bus 46 has a bit width of 128 bits, for example, so that rendering can be executed at high speed in image memory 43. Rendering engine 41 has the capability to render 320×240 pixel or 640×480 pixel image data in NTSC, PAL or other formats, for example, in realtime at least 10 to several dozen times within 1/30 to 1/60 second.

Image processing chip 33 also has programmable CRT controller (PCRTC) 44, and this PCRTC 44 has functions for controlling in realtime the position, size, resolution, or other properties of the image data that was input from video camera 35. PCRTC 44 writes the image data that was input from video camera 35 to texture area 51 (FIG. 7) of image memory 43 via memory interface 42. Also, PCRTC 44 reads the image data that was rendered in rendering area 52 (FIG. 7) of image memory 43 via memory interface 46 and outputs this data to CRT 36 for display.

Figure 7:
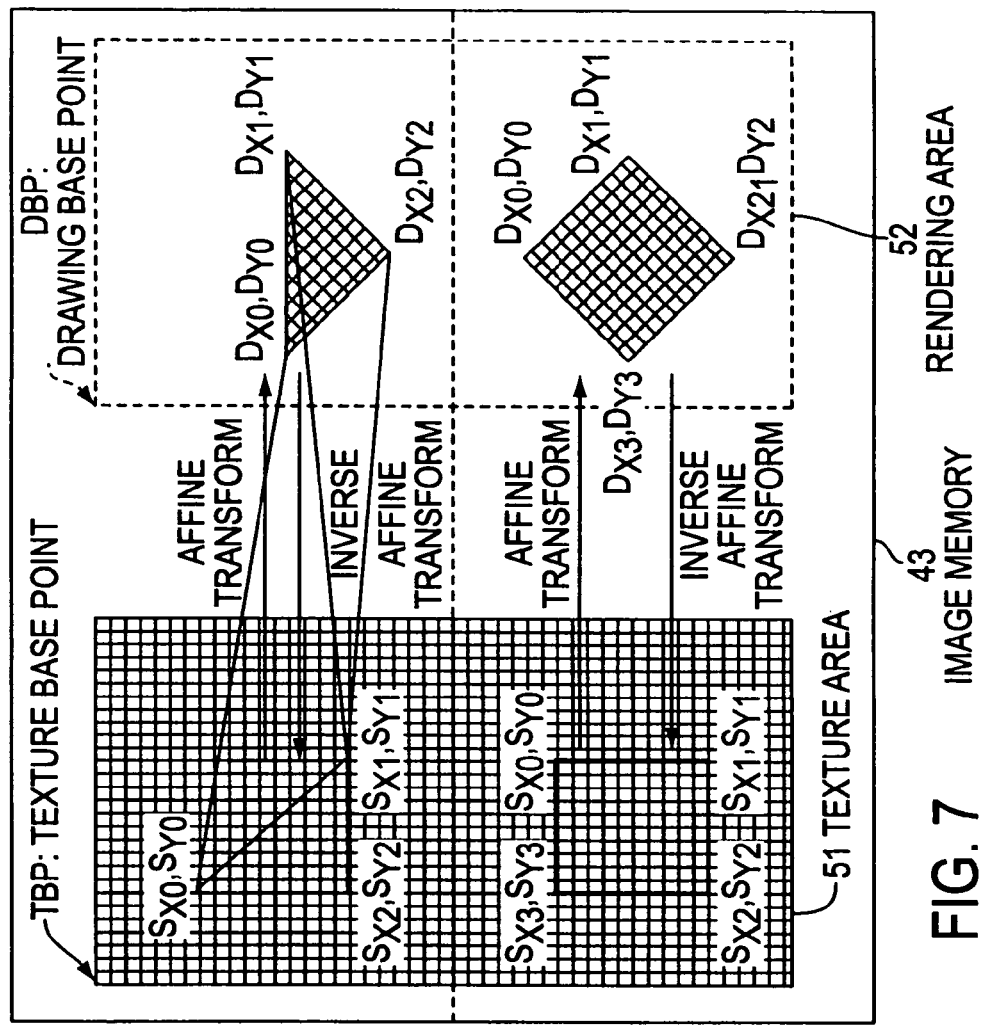
FIG. 7 is a diagram used to explain the storage area within the image memory of the device of FIG. 6.

Image memory 43 has a unified memory structure in which texture area 51 and rendering area 52 can be specified in the same area, as shown in FIG. 7.

When main CPU 31 renders a stipulated texture of texture area 51 in rendering area 52, it generates a Flat Texture Polygon command and outputs this command to rendering engine 41. For example, the command for rendering a triangle polygon is as follows.

Flat Texture Triangle(Dx0,Dy0,Dx1,Dy1 ,Dx2,Dy2,Sx0, Sy0,Sx1,Sy1,Sx2,Sy2,L)

Here, Dx0, Dy0, Dx1, Dy1, Dx2, and Dy2 represent the coordinates of the vertices of the triangle to be rendered at the destination (rendering area 52) and Sx0, Sy0, Sx1, Sy1, Sx2, and Sy2 represent the coordinates of the vertices of the source (texture area 51) triangle. Also, L represents the luminance value to be multiplied by the texture pixel values within the polygon (triangle) that is represented by the point sequence (Sxn,Syn).

Similarly the rectangle rendering command is expressed as follows.

Flat Texture Rectangle(Dx0,Dy0,Dx1,Dy1,Dx2,Dy2,Dx3, Dy3,Sx0,Sy0,Sx1,Sy1,Sx2,Sy2,Sx3,Sy3,L)

Here, Dx0, Dy0, Dx1, Dy1, Dx2, Dy2, Dx3, and Dy3 represent the coordinates of the vertices of the rectangle to be rendered at the destination (rendering area 52) and Sx0, Sy0, Sx1, Sy1, Sx2, Sy2, Sx3, and Sy3 represent the coordinates of the vertices of the source (texture area 51) rectangle.

When a triangle rendering command, for example, is input from main CPU 31 via bus 34, rendering engine 41 multiplies the value L by the pixel values of the points (Sxn,Syn) within the polygon defined by the coordinates (Sx0,Sy0), (Sx1,Sy1), and (Sx2,Sy2) of the three vertices in texture area 51 and renders the results at the corresponding points (Dxn,Dyn) within the polygon defined by the coordinates (Dx0,Dy0), (Dx1,Dy1), and (Dx2,Dy2). The coordinates (Dxn,Dyn) in rendering area 52 that correspond to coordinates (Sxn,Syn) of texture area 51 can be obtained by the affine transformation processing represented by the following equation (11).

$$\begin{pmatrix} D_{xn} \\ D_{yn} \end{pmatrix} = \begin{pmatrix} a, b \\ c, d \end{pmatrix} \begin{pmatrix} S_{xn} \\ S_{yn} \end{pmatrix} + \begin{pmatrix} OFX \\ OFY \end{pmatrix} \qquad (11)$$

In the above equation, a, b, c, and d are coefficients for rotation, and OFX and OFY are coefficients for translation.

Actually, rendering is performed in pixel units in rendering area 52, and the pixel values of the coordinates in texture area 51 that are obtained from the coordinates in the rendering area by the inverse affine transformation processing represented by the following equation (12) are used as the pixel values that are rendered.

$$\begin{pmatrix} x+h \\ y+v \end{pmatrix} \begin{pmatrix} a, b \\ c, d \end{pmatrix}^{-1} \begin{pmatrix} x - OFX \\ y - OFY \end{pmatrix} \qquad (12)$$

In the above equation, h and v are coefficients that are greater than or equal to 0 and less than 1.0, and x, y, X, and Y are integers.

Figure 8:
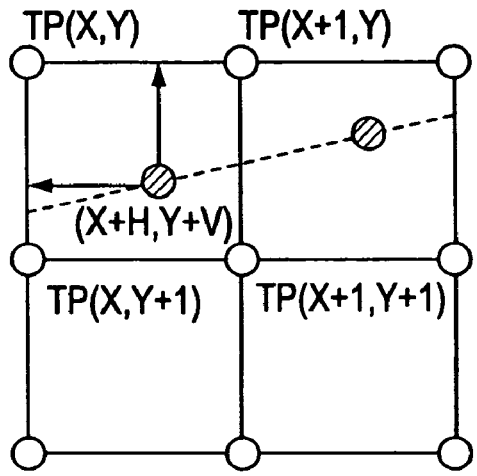
FIG. 8 is a diagram used to explain bilinear interpolation.
Figure 9:
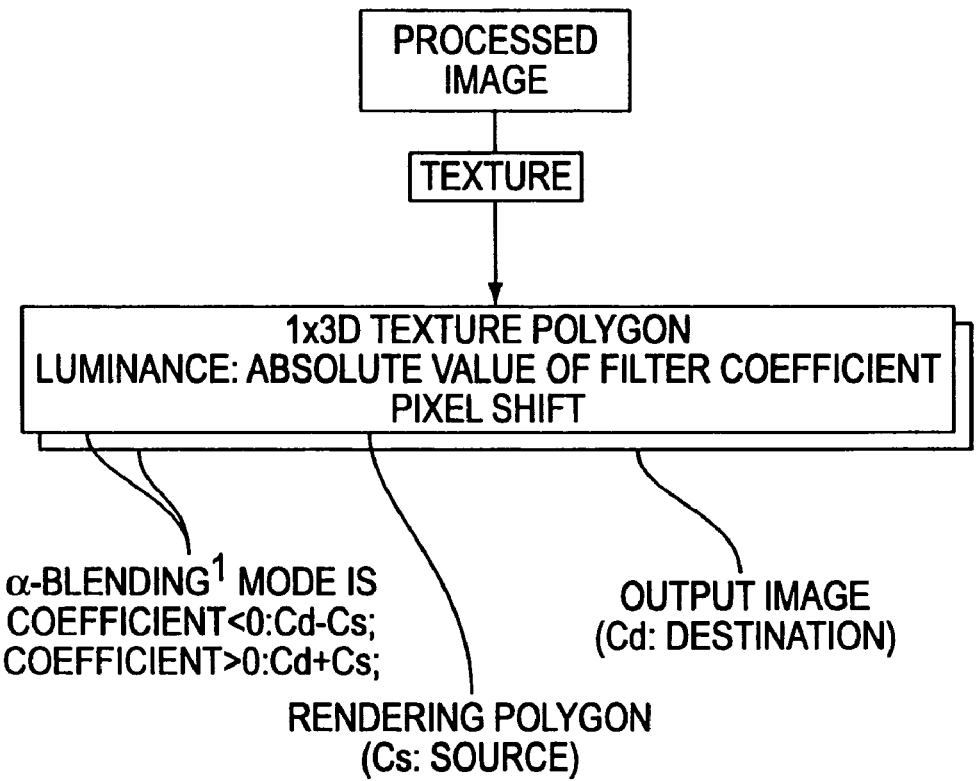
FIG. 9 is a diagram used to explain convolution filtering.

Also, since these coordinate values normally have fractional parts and become coordinates that are positioned between individual pixels, as shown in FIG. 8, the pixel value SP(X,Y), for which bilinear interpolation was performed according to the equation shown below, is used.

$$SP(X,Y)=(1-h)*(1-v)*TP(x,y)+h*(1-V)*TP(x+1,y)+ \\ (1-h)*v*TP(x,y+1)+(h)*(v)*TP(x+1,y+1) \qquad (13)$$

That is, a weighted value corresponding to the distances from the surrounding points TP(x,y), TP(x+1,y), TP(x,y+1), and TP(x+1,y+1) is used for the pixel value of the point (x+h,y+v), which is separated by a distance of +h in the x-direction and +v in the y-direction from the point TP(x,y) in texture area 51.

In addition, rendering engine 41 performs blending between the destination pixel value DP(X,Y) in rendering area 52 and the source pixel value SP(X,Y) in texture area 51 according to the mode specified from main CPU 31 by the blending mode setting function Set Mode (MODE).

The blending modes executed by rendering engine 41 are mode 0, mode 1, mode 2, and mode 3. The following blending is executed in each mode.

MODE0: SP(X,Y)
MODE1: DP(X,Y)+SP(X,Y)
MODE2: DP(X,Y)−SF(X,Y)
MODE3: (1−αSP(X,Y)*DP(X,Y)
+αSP(X,Y)*SP(X,Y)

SP(X,Y) represents the value of the source pixel value.

That is, in mode 0, the source pixel value is rendered directly at the destination. In mode 1, the source pixel value is added to the destination pixel value and the sum is rendered. In mode 2, the source pixel value is subtracted from the destination pixel value and the difference is rendered. In mode 3, the source and destination pixel values are combined by performing a weighting corresponding to the source value.

The image data that was rendered in rendering area 52 of image memory 43 is loaded into PCRTC 44 via memory interface 46 and output from there to CRT 36 for display.

Here follows an explanation of processing in which convolution filtering is executed for the image data that was input from video camera 35 and the result is output to CRT 36.

Figure 10:
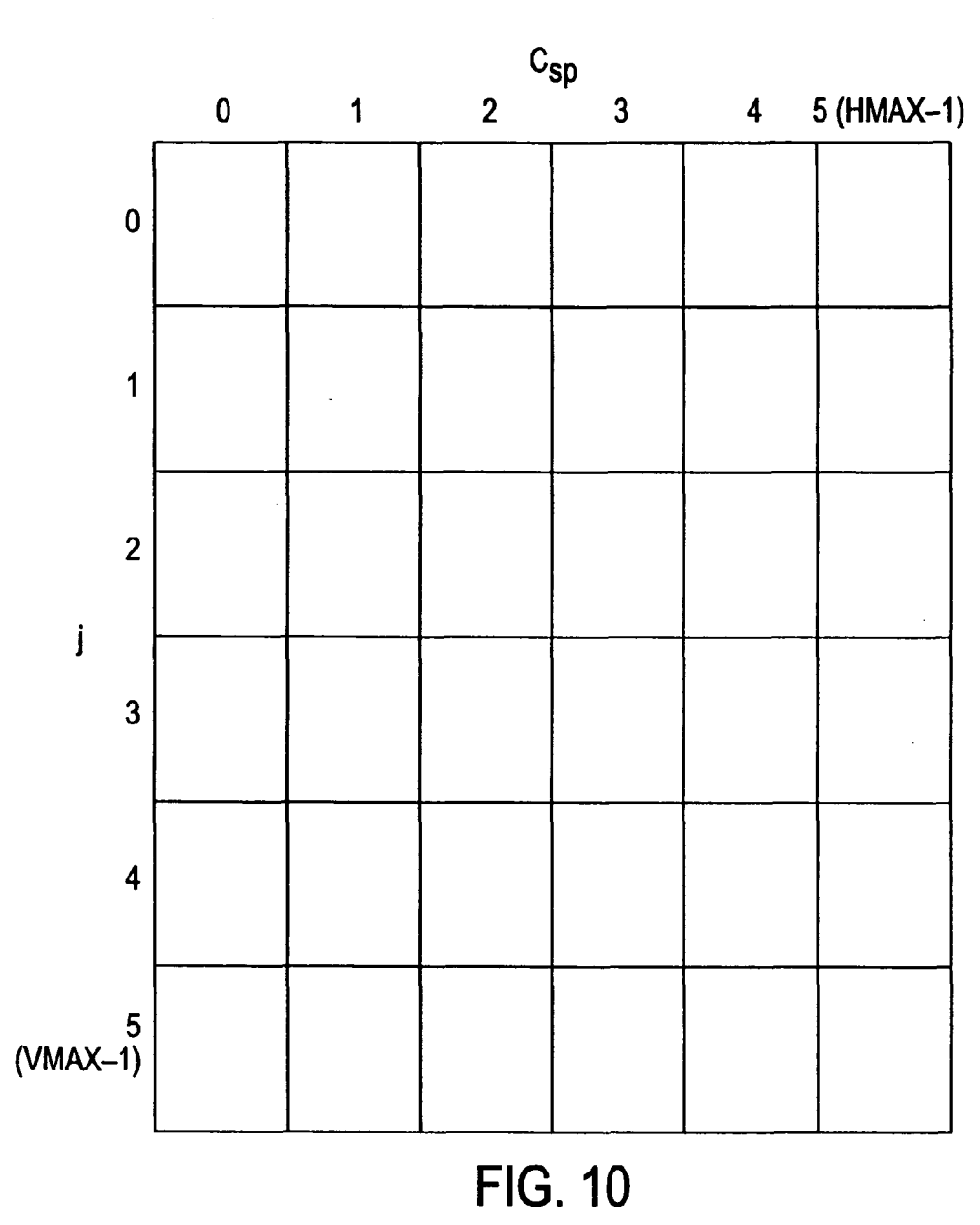

In this case, the image data to be processed, which was input from video camera 35, is written from PCRTC 44 to texture area 51 of image memory 43 via memory interface 42, as shown in FIG. 6. This results in an XMAX×VMAX array of source pixel data $C_{SP}$ being written to texture area 51, as shown in FIG. 10, for example.

An m×n array of convolution filter coefficients (3×3 for the example in FIG. 11) for performing convolution filtering computations on this image data is provided as shown in FIG. 11, for example. These convolution filter coefficients are multiplied by a 3×3 array of pixel data centered on the source subject pixel, and the value obtained by adding these multiplication results is rendered in rendering area 52 as the destination pixel data corresponding to the subject pixel.

However, in this embodiment, a single convolution filter coefficient $C_{00}$ is first extracted from among the 3×3 array of convolution filter coefficients, and rendering is performed by first multiplying this convolution filter coefficient $C_{00}$ by all of the source image data in texture area 51. Next, a convolution filter coefficient located at a position shifted by one pixel (for example, $C_{01}$) is read, and rendering is performed by multiplying this convolution filter coefficient by all of the source pixel data and adding the result to or subtracting the result from the destination pixel value in rendering area 52 at which the computed value has already been rendered.

Convolution filtering is executed by repeatedly executing the processing described above.

That is, when the convolution filter coefficient is positive, main CPU 31 outputs the commands shown below to rendering engine 41 to execute convolution filtering.

Figure 12:
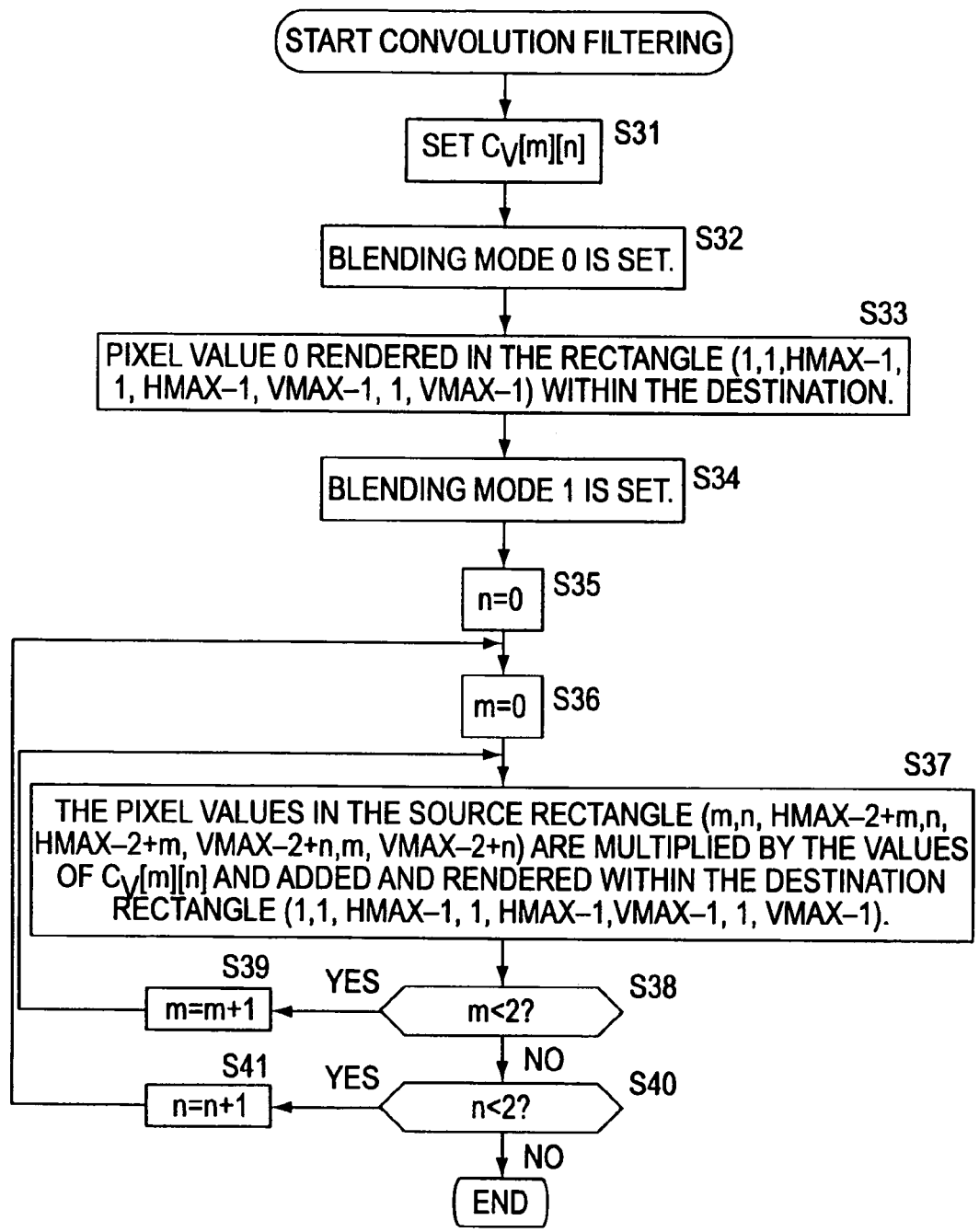
FIG. 12 is a flowchart used to explain convolution filtering.

Set_Mode(0);
Flat Rectangle (1,1, HMAZ-1, 1, HMAX-1, VMAX-1, 1, VMAX-1, 0);
Set Mode(1);
for (n=o; n<3; n++){
  for (m=0; m<3; m++){
    Flat Texture Rectangle (1,1, HMAX-1, 1, HMAX-1, VMAX-1, 1, VMAX-1, m n.HMAX-2+m n, HMAX-2+m VMAX-2+n m VMAX-2+n Cv[m][n]):

FIG. 12 shows the above processing method represented in a flowchart.

First, in step S31, main CPU 31 causes rendering engine 41 to clear rendering area 52 (output area) as the destination and then to set convolution filter coefficients $C_v[m][n]$ to stipulated values. In this case, a 3×3 array of convolution filter coefficients is provided, as shown in FIG. 11.

Next, in step S32, main CPU 31 outputs a command to rendering engine 41 for setting mode 0 as the blending mode. Rendering engine 41 sets the blending mode to mode 0 according to this command.

Next, in step 33, main CPU 31 generates a command for rendering the pixel value 0 in the rectangle (1, 1, HMAX-1, 1, HMAX-1, VMAX-1, 1, VMAX-1) within the destination constituted by the HMAX VMAX array of pixels and outputs this command to rendering engine 41. Rendering engine 41 renders the value 0 at each pixel excluding the row j=0 and the column i=0 within the HMAX VMAX destination, as shown in FIG. 13, according to this command.

Next, in step S34, rendering engine 41 sets mode 1 as the blending mode according to an instruction from main CPU 31. That is, the mode in which rendering is performed by adding the source pixel value to the destination pixel value is fixed.

Next, in steps S35 and S36, the variable n, which represents the y-coordinate of the convolution filter coefficient, and the variable m, which represents the x-coordinate of the convolution filter coefficient, are each initialized to 0.

Next, in step S37, rendering engine 41 executes processing in which the values of the convolution filter coefficients $C_v[m][n]$, as shown in FIG. 11, are multiplied by the pixel values within the range of the rectangle polygon (m, n, HMAX-2+m, n, HMAX-2+m, VMAX-2+n, m, VMAX-2+n) among the source pixel values constituted by the HMAX VMAX array of pixel data $C_{SP}$, as shown in FIG. 10, and the results are rendered within the range of the destination rectangle (1, 1, HMAX-1, 1, HMAX-1, VMAX-1, 1, VMAX-1). In this case, the values obtained by multiplying coefficient $C_{00}(=C_v[0][0])$ by the source pixel data $C_{SP}$ from the range i=0 to 4, j=0 to 4 as shown in FIG. 10 are rendered in the range i=1 to HMAX-1 (HMAX-1=5 for the example in FIG. 14), j=1 to VMAX-1 (VMAX-1=5 for the example in FIG. 14) within the HMAX VMAX destination area as shown in FIG. 14 of rendering area 52 in image memory 43. For example, $$C_{dp11}=C_{SP00}C_{00}$$

and $$C_{dp21}=C_{SP10}C_{00}$$

are obtained. Also, $$C_{dp12}=C_{SP01}C_{00}$$

and $$C_{dp22}=C_{SP11}C_{00}$$

are obtained.

Next, processing advances to step S38 where a judgment is made to determine whether or not the variable m is less than 2. Since m=0 at this time, the judgment result is YES. Therefore, processing advances to step S39, and the variable m is incremented by 1. At this time, m=1.

Next, processing returns to step S37, where rendering is performed by adding the values obtained by multiplying convolution filter coefficient $C_v[1][0]$ $(=C_{10})$ by the pixel data $C_{SP}$ from the range defined by i=1 to 5, j=0 to 4 in FIG. 10 to the previously rendered values in the destination rectangle defined by i=1 to 5 and j=1 to 5. That is, for example, $$C_{dp11}=C_{SP00}C_{00}+C_{SP10}C_{10}$$

and $$C_{dp21}=C_{SP10}C_{00}+C_{SP20}C_{10}$$

are obtained as shown in FIG. 15. Also, $$C_{dp12}=C_{SP01}C_{00}+C_{SP12}C_{10}$$

and $$C_{dp22}=C_{SP11}C_{00}+C_{SP21}C_{10}$$

are obtained.

Next, processing advances to step S38 where a judgment is made to determine whether or not the variable m is less than 2. Since m=1 at this time, the judgment result is YES. Therefore, processing advances to step S39, and the variable m becomes m=2. Then, processing returns to step S37, where rendering is performed by further adding the values obtained by multiplying convolution filter coefficient $C_v[2][0]$ $(=C_{20})$ by the pixel data from the range defined by i=2 to 5, j=1 to 5 of the source rectangle to the previously rendered pixel values in the destination rectangle.

As a result of this processing, values such as $C_{dp11}$, $C_{dp21}$, $C_{dp12}$ [was "$C_{dp1}$ $C_{21}$"] and $C_{dp22}$, for example, are obtained as shown in FIG. 16.

$$C_{dp11}=C_{SP00}\times C_{00}+C_{SP10}\times C_{10}+C_{SP20}\times C_{20}$$

$$C_{dp21}=C_{SP10}\times C_{00}+C_{SP20}\times C_{10}+C_{SP30}\times C_{20}$$

$$C_{dp12}=C_{SP01}\times C_{00}+C_{SP11}\times C_{10}+C_{SP21}\times C_{20}$$

$$C_{dp22}=C_{SP11}\times C_{00}+C_{SP21}\times C_{10}+C_{SP31}\times C_{20}$$

Since the pixel value of $C_{SP65}$ is required as source pixel data at this time and this image data does not actually exist, the pixel data $C_{dp}$ for i=5 (=HMAX-1) becomes invalid pixel data, as shown in FIG. 16.

Next, processing advances to step S38 where a judgment is made to determine whether or not the variable m is less than 2. Since m=2 at this time, the judgment result is NO. Therefore, processing advances to step S40. In step S40, a judgment is made to determine whether or not the variable n is less than 2. Since n=0 at this time, the judgment result is YES. Therefore, processing advances to step S41 where n is incremented by 1. After n becomes n=1, processing returns to step S36.

In step S36, variable m is initialized to 0 again, and in step S37, processing is executed in which rendering is performed by further adding the values obtained by multiplying convolution filter coefficient $C_v[0][1]$ (=$C_{01}$) by the source pixel data $C_{SP}$ [was $C_{dp}$] from the range defined by i=0 to 4, j=1 to 4 to the previously rendered destination values.

$$C_{dp11}=C_{SP00}\times C_{00}+C_{SP10}\times C_{10}+C_{SP20}\times C_{20}+C_{SP01}\times C_{01}$$

$$C_{dp21}=C_{SP10}\times C_{00}+C_{SP20}\times C_{10}+C_{SP30}\times C_{20}+C_{SP11}\times C_{01}$$

$$C_{sp12}=C_{SP01}\times C_{00}+C_{SP11}\times C_{10}+C_{SP21}\times C_{20}+C_{SP02}\times C_{01}$$

$$C_{dp22}=C_{SP11}\times C_{00}+C_{SP21}\times C_{10}+C_{SP31}\times C_{20}+C_{SP12}\times C_{01}$$

Figure 18:
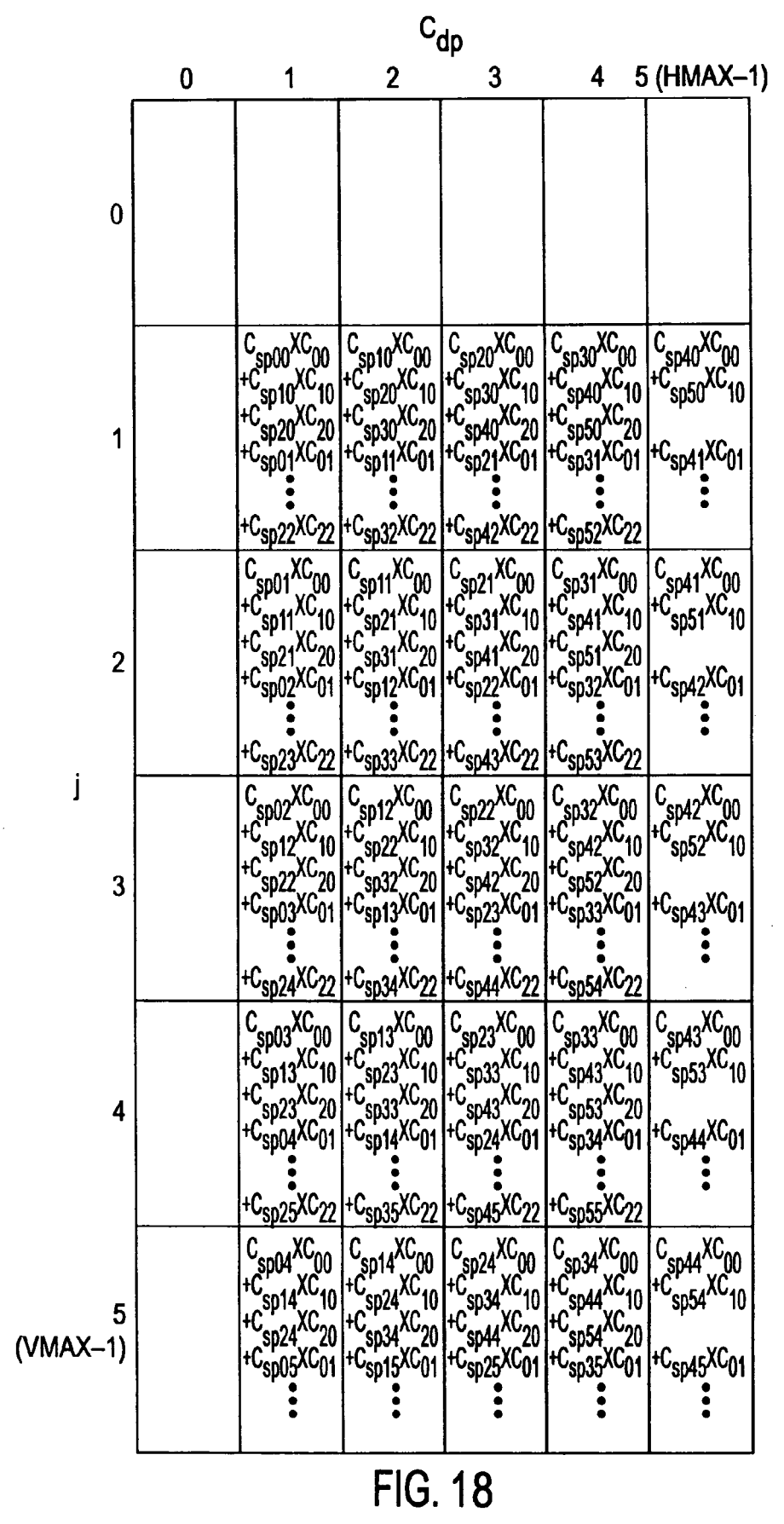

As a result of this processing, values such as $C_{dp11}$, $C_{dp21}$, $C_{dp12}$, and $C_{dp22}$, for example, are obtained as shown in FIG. 17.
***Insert entries for these values Thereafter, similar processing is executed repeatedly until the judgment is made in step S40 that variable n is not less than 2 (that is, until the variable n becomes n=2). As a result of this processing, rendering such as that shown in FIG. 18 is performed in the destination area and values such as $C_{dp11}$, $C_{dp21}$, $C_{dp12}$, and $C_{dp22}$, for example, are obtained.

$$C_{jp11}=C_{SP00}\times C_{00}+C_{SP10}\times C_{11}+C_{SP10}\times C_{10}+C_{SP01}\times C_{01}+C_{SP11}\times C_{11}+C_{SP11}\times C_{11}+C_{SP01}\times C_{01}+C_{SP12}\times C_{12}\times +C_{SP22}\times C_{SP22}$$

$$C_{ip21}=C_{SP10}\times C_{00}+C_{SP10}\times C_{10}+C_{SP10}\times C_{10}C_{SP11}\times C_{01}+C_{SP11}\times C_{11}+C_{SP11}\times C_{11}+C_{SP12}\times C_{01}+C_{SP12}\times C_{11}\times +C_{SP11}\times C_{SP12}$$

$$C_{jp11}=C_{SP01}\times C_{00}+C_{PS11}\times C_{14}+C_{SP21}\times C_{10}+C_{SP01}\times C_{01}+C_{SP12}\times C_{11}+C_{SP11}\times C_{11}+C_{SP11}\times C_{11}+C_{jp01}\times C_{02}+C_{SP12}\times C_{12}\times +C_{SP11}\times SP_{22}$$

$$C_{ip11}=C_{SP11}\times C_{00}+C_{SP21}\times C_{10}+C_{SP11}\times C_{10}+C_{SP12}\times C_{01}+C_{SP11}\times C_{11}+C_{SP32}\times C_{11}+C_{SP13}\times C_{01}+C_{SP23}\times C_{1}\times +C_{SP33}\times C_{jp11}$$

Since the pixel value of $C_{SP16}$ is required as source pixel data at this time and this image data does not actually exist, the pixel data $C_{dp}$ for j=5 (=VMAX-1) becomes invalid pixel data, as shown in FIG. 16.

As a result of the processing described above, pixel data values are obtained for which convolution filtering was executed in the range defined by i=1 to HMAX-2 and j=1 to VMAX-2.

The processing described above is for convolution filter coefficients that are positive. If the convolution filter coefficients contain negative numbers, the rendering commands that are output from main CPU 31 to rendering engine 41 are as follows.

```
Set_Mode(0);
Flat_Rectangle (1, 1, HMAX-1, 1, HMAX-1, VMAX-1, 1,
    VMAX-1, CMAX/2);
for (n=0; n<3; n++){
    for (m=0; m<3; m++){
        if(Cv[m][n]>0{
            Set_Mode(1);
                Flat_Texture_Rectangle (1, 1, HMAX-1, 1,
                    HMAX-1, VMAX-1, 1, VMAX-1,m,n, HMAX-
                    2+m, n, HMAX-2+m, VMAX-2+n,m, VMAX-
                    2+n Cv[m][n]);
        }
        if(Cv[m][n]<0)}
            Set_Mode(2);
            Flat_Texture_Rectangle (1, 1, HMAX-1, 1, HMAX-1,
                VMAX-1, 1, VMAX-1,m,n, HMAX-2+m, n, HMAX-
                2+m, VMAX-2+n,m, VMAX-2+n -Cv[m][n]);
    }
Set_Mode(2);
Flat_Rectangle (1, 1, HMAX-1, 1, HMAX-1, VMAX-1, 1,
    VMAX-1, CMAX/2);
```

Figure 19:
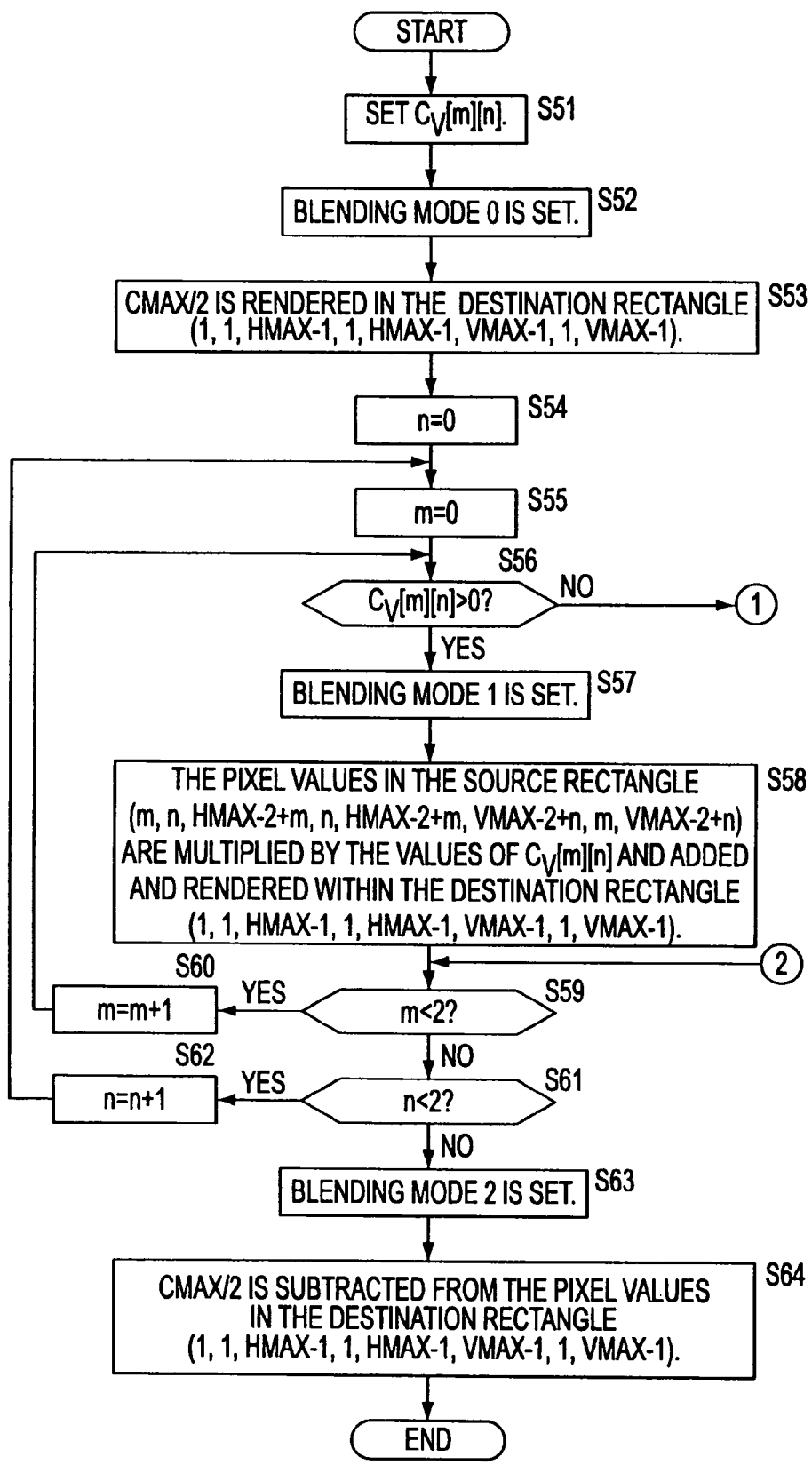
FIG. 19 is a flowchart used to explain another example of convolution filtering.
Figure 20:
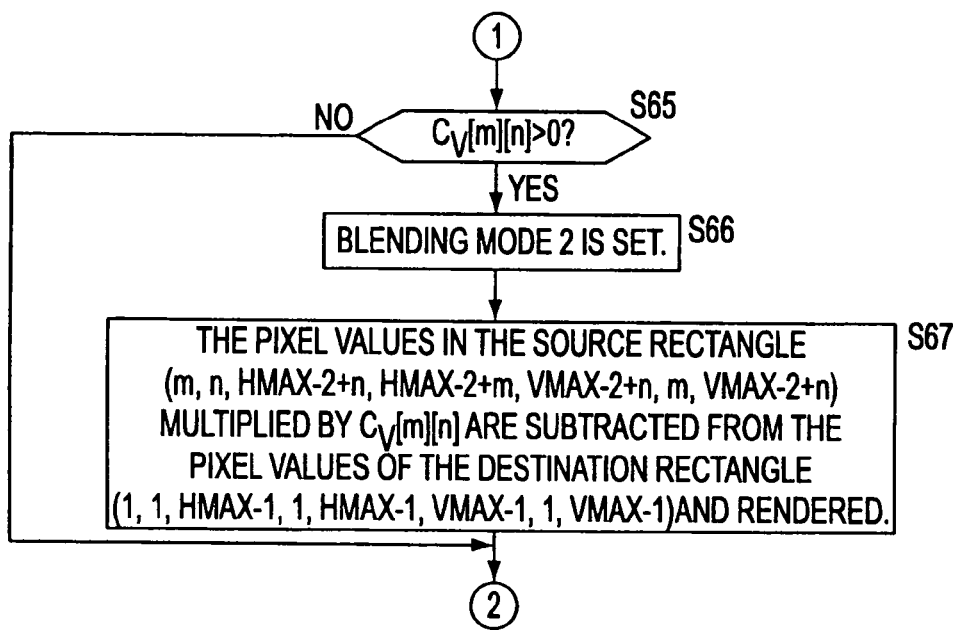
FIG. 20 is a flowchart used to explain another example of convolution filtering.

FIG. 19 and FIG. 20 show this process represented as a flowchart.

First, in step S51, the convolution filter coefficients $C_v[m][n]$ are set to stipulated values. Next, in step S52, rendering engine 41 sets mode 0 as the blending mode according to an instruction from main CPU 31. Then, in step S53, rendering engine 41 renders the value CMAX/2 in the destination area rectangle (1, 1, HMAX-1, 1, HMAX-1, VMAX-1, 1, VMAX-1) in rendering area 52 of image memory 43. CMAX is the maximum value of the pixel values. In this case, the value that is ½ of the maximum value of the pixel values is rendered in the range defined by i=1 to HMAX-1 and j=1 to VMAX-1 of the destination area, as shown in FIG. 21.

Next, in steps S54 and S55, the variables n and m are each initialized to 0, and in step S56, a judgment is made to determine whether or not the convolution filter coefficient $C_v[m][n]$ is positive. If this filter coefficient is positive, processing advances to step S57 where mode 1 is set as the blending mode. Next, processing advances to step S58 and rendering is performed. Since this rendering is similar to the processing in step S37 of FIG. 12, which was described above, its explanation is omitted here.

After step S58, processing advances to step S59 where a judgment is made to determine whether or not the variable m is less than 2. If m is judged to be less than 2, processing advances to step S60, where the variable m is incremented by 1. Then, processing returns to step S56. The subsequent processing is executed again.

In step S59, if the variable m is not judged to be less than 2 (that is, when m=2), processing advances to step S61, where a judgment is made to determine whether the variable n is less than 2. If the variable n is less than 2, processing advances to step S62, where the variable n is incremented by 1. Then, processing returns to step S55, and the subsequent processing is executed again.

In step S61, if the variable n is not judged to be less than 2 (that is, when n=2), processing advances to step S63, where mode 2 is set as the blending mode. Then, in step S64, rendering engine 41 executes processing in which rendering is performed by subtracting the CMAX/2 values that were rendered in step S53 from the pixel values of the destination area rectangle (1, 1, HMAX-1, 1, HMAX-1, VMAX-1, 1, VMAX-1).

On the other hand, when the convolution filter coefficient $C_v[m][n]$ is not judged to be positive in step S56, processing advances to step S65, where a judgment is made to determine whether or not this coefficient is negative. If this coefficient is judged to be negative, processing advances to step S66, where mode 2 is set as the blending mode. Then in step S67, similar rendering processing is executed as the processing in step S58 (that is, step S37 of FIG. 12).

In step S65, if the coefficient $C_v[m][n]$ is not judged to be negative (that is, this coefficient is judged to be 0), the processing of steps S66 and S67 is skipped.

After step S67, processing advances to step S59, and similar processing to that described above is executed.

Figure 22:
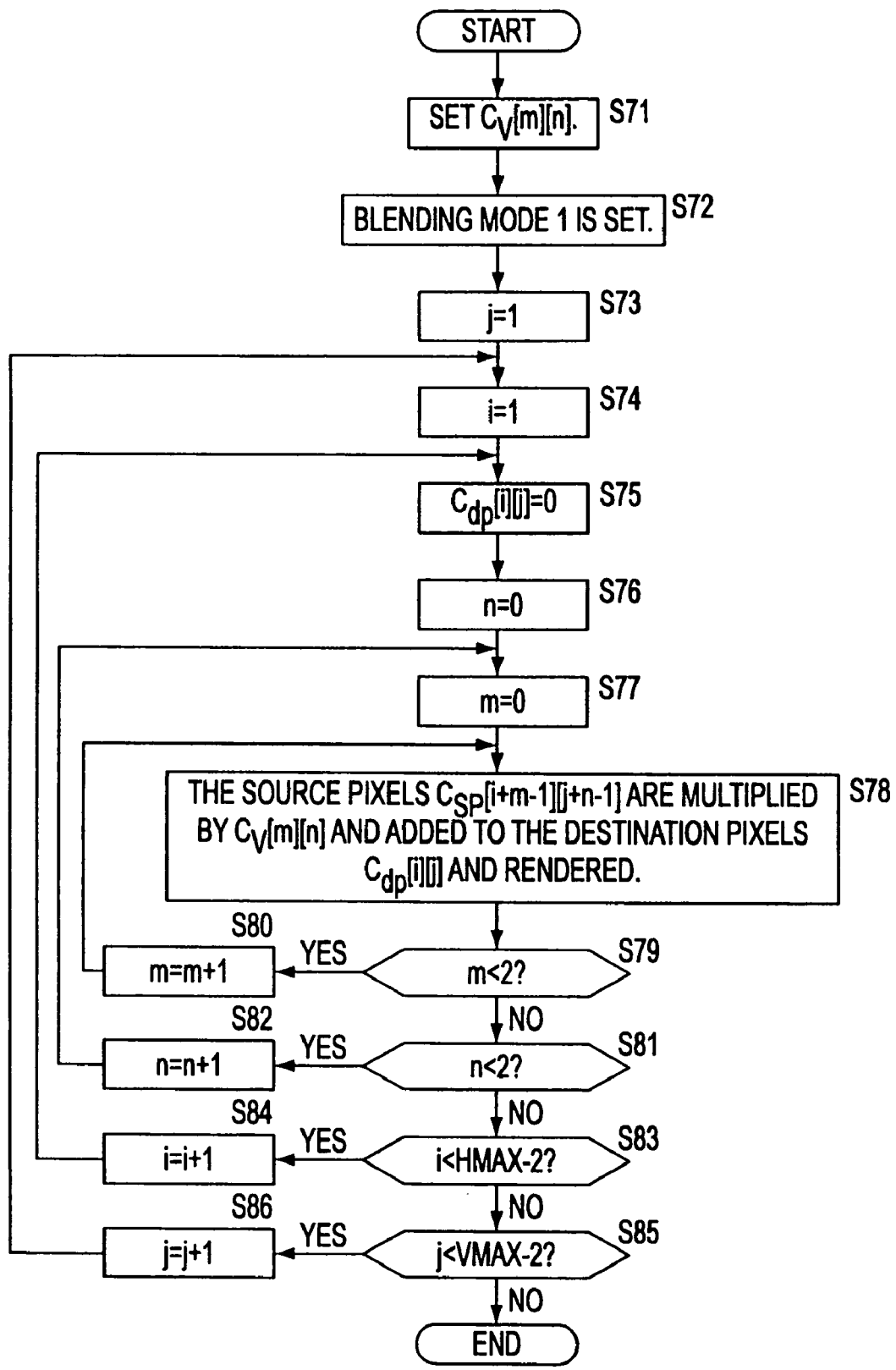
FIG. 22 is a flowchart used to explain still another example of convolution filtering.

Although the above processing executed convolution filtering by rendering pixel data in units of polygons, similar processing can be executed even if the rendering is performed in units of pixels. FIG. 22 shows a processing example for this case.

First, in step S71, the convolution filter coefficients $C_v[m][n]$ are set. In step S72, mode 1 is set as the blending mode. In steps S73 and S74, the variables j and i are each initialized to 1, and in step S75, the values of the destination pixel data $C_{dp}[i][j]$ are initialized to 0.

Next, in steps S76 and S77, the variables n and m are initialized to 0. In step S78, processing is executed in which rendering is performed by multiplying the convolution filter coefficient $C_v[m][n]$ by the source pixel data $C_{SP}[i+m-1][j+n-1]$ and adding the result to the destination pixel data $C_{dp}[i][j]$.

Next, in step S79, a judgment is made to determine whether or not the variable m is less than 2. Since m=0 at this time, the judgment result is YES, and the variable m is incremented by 1 in step S80. After m is set to m=1, processing returns to step S78.

In step S78, processing is executed in which rendering is performed by multiplying the adjacent convolution filter coefficient $C_v[m][n]$ located one pixel to the right in the X-direction by the adjacent source pixel data $C_{SP}[i+m-1][j+n-1]$ located one pixel to the right in the X-direction and adding the result to the same destination pixel data $C_{dp}[i][j]$.

Similar processing is repeatedly executed until the variable m is not judged to be less than 2 (that is, until m=2) in step S79. Then, processing advances to step S81 where a judgment is made to determine whether or not the variable n is less than 2. If the variable n is less than 2, processing advances to step S82, where the variable n is incremented by 1. Then, processing returns to step S77, and the subsequent processing is executed again.

The above processing is repeatedly executed until the variable n is not judged to be less than 2 (that is, until n=2) in step S81. The processing described above causes the results of multiplying by each of the elements of the 3×3 array of convolution filter coefficients to be repeatedly rendered and added to the same destination pixel data $C_{dp}[i][j]$. That is, the convolution filtering of a single subject pixel is completed.

Next, processing advances to step S83, where a judgment is made to determine whether or not the variable i is less than HMAX-2. If the variable i is less than HMAX-2, processing advances to step S84, where the variable i is increment by 1. After the variable i is incremented, processing returns to step S75, and subsequent processing is executed again. That is, the destination pixel data is shifted one pixel at a time in the X-direction, and similar processing is executed.

In step S83, if the variable i is not judged to be less than HMAX-2 (that is, when i=HMAX-2), processing advances to step S85, where a judgment is made to determine whether or not the variable j is less than VMAX-2. If the variable j is less than VMAX-2, processing advances to step S86, where the variable j is increment by 1. After the variable j is incremented, processing returns to step S74, and subsequent processing is executed again. That is, similar processing is repeatedly executed sequentially while the destination pixel data is shifted one pixel at a time in the Y-direction. Then, when the variable j is judged to be j=VMAX-2 in step S85, convolution filtering is terminated.

This processing enables a similar result to be obtained as the processing shown in FIG. 12 or in FIG. 19 and FIG. 20. However, when rendering is performed in units of pixels, not in units of polygons, the processing ultimately takes considerable time because the address generation processing is time consuming. Therefore, it is preferable to execute rendering in units of polygons as shown in FIG. 12 or in FIG. 19 and FIG. 20.

Here follows an explanation of pyramid filtering. Pyramid filtering repeatedly performs processing in which the average value of four mutually adjacent pixel values of a processing image is obtained and that pixel is placed at the center of the four pixels. That is, when processing that computes the average pixel value of four neighboring points according to bilinear interpolation is executed, an (n/2) (n/2) array of image data is obtained from an n n (n is a power of 2) array of processing image data. When this processing is repeatedly executed, the data for the single pixel at the apex of the pyramid will be the pixel data representing the average value of all of the pixels of the base of the pyramid.

To execute this kind of pyramid filtering, main CPU 31 outputs the following kind of rendering commands to rendering engine 41.

```
int L; /* Length of one side of source area */
int offset;
L=2N^;/* Length of one side initial image *
offset=0;
while (L>1){
    Set Texture Base (0, offset); /* Set base point of texture area */
    offset+=L;
    Set Drawing Rectangle (0, offset); /* Set base point of rendering area */
    Flat Texture Rectangle (0,0, L/2, 0, L/2, L/2, 0, L/2, 0.5, 0.5, L+0.5, 0.5, L+0.5, L+0.5, 0.5, 0.5, L+0.5, 1.0);
    L=L/2;
```

Figure 24:
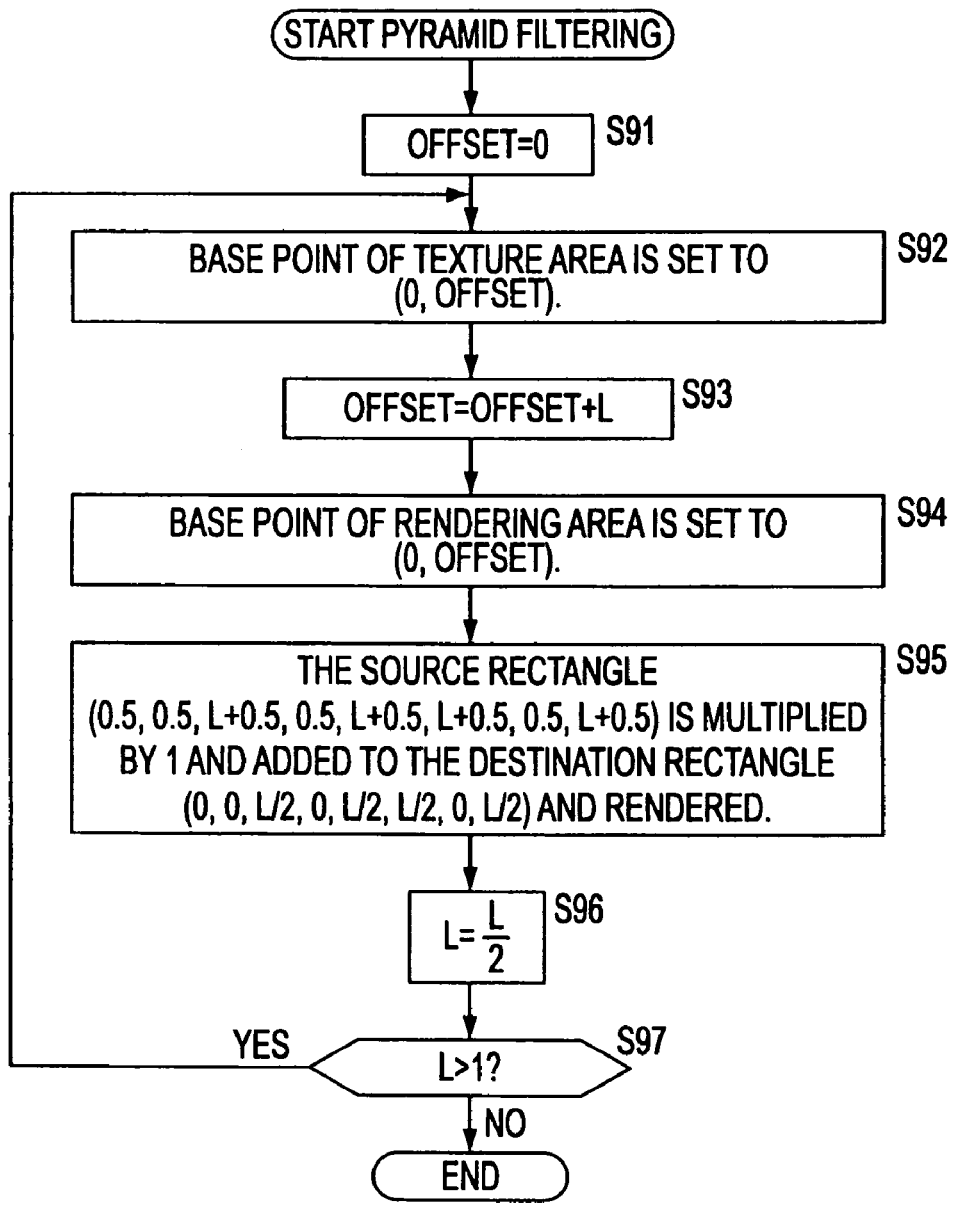
FIG. 24 is a flowchart used to explain pyramid filtering.
Figure 25:
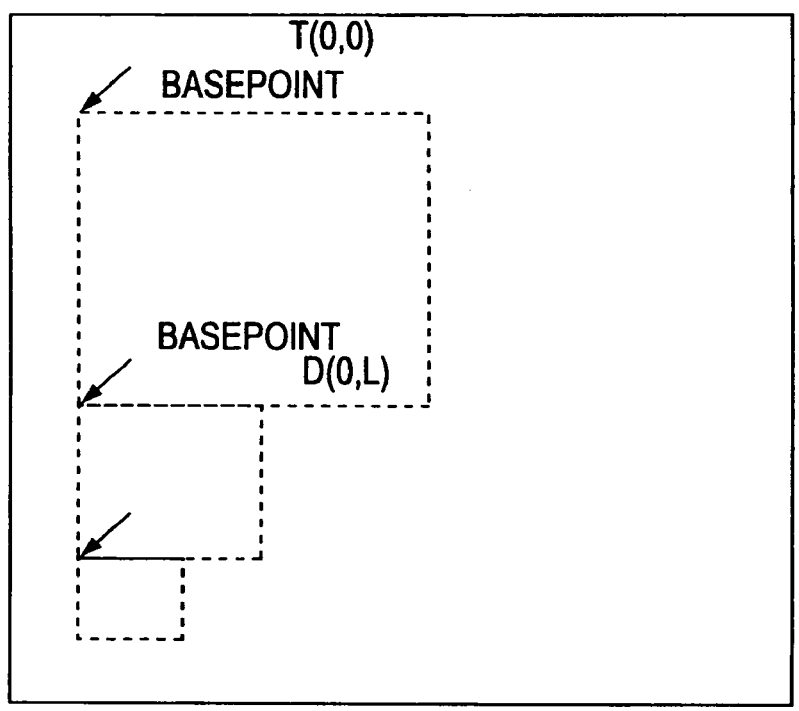
FIG. 25 is a diagram used to explain the processing of steps S92 and S94 in FIG. 24.

FIG. 24 shows these rendering commands represented as a flowchart. First, in step S91, the variable offset is initialized to 0. Next, in step S92, processing is executed in which (0, offset) is set for the base point of texture area 51. That is, the base point T(0,0) is set, as shown in FIG. 25. Next, processing advances to step S93, where the variable offset is incremented by L. Then, in step S94, (0,offset) is set for the base point of rendering area 52. At this time, the base point D(0,L) is set, as shown in FIG. 25.

Figure 23:
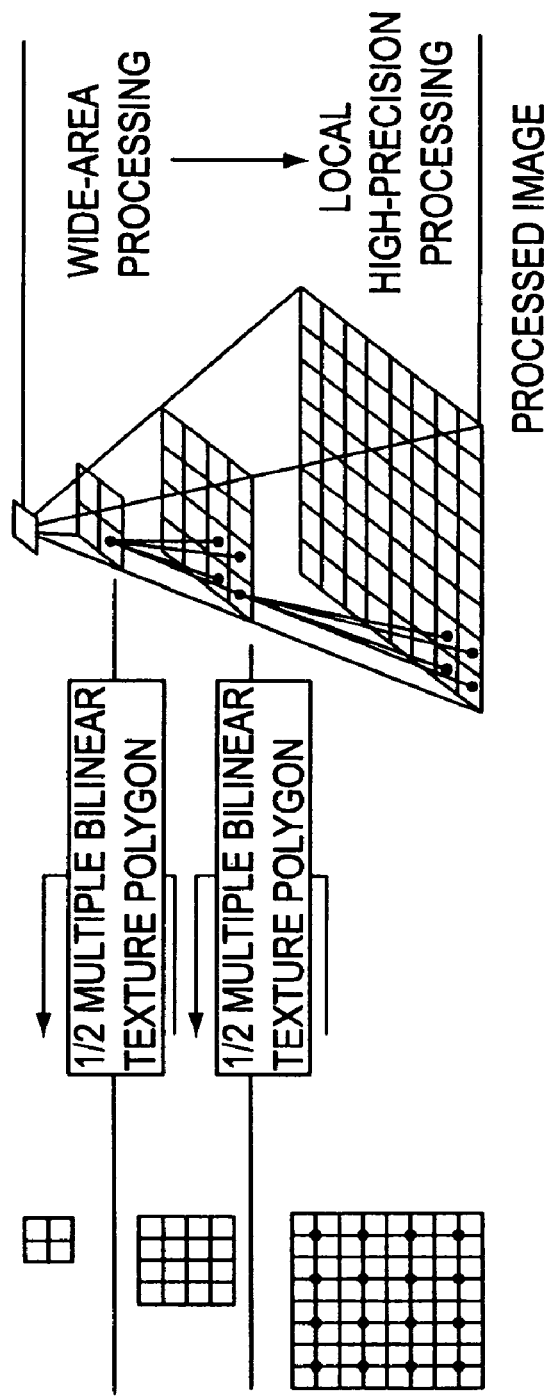
FIG. 23 is a diagram used to explain pyramid filtering.

Next, in step S95, processing is executed in which rendering is performed by multiplying 1 by the pixel values of the source (texture) rectangle (0.5, 0.5, L+0.5, 0.5, L+0.5, L+0.5, 0.5, L+0.5) and adding the result to the destination rectangle (0, 0, L/2, 0, L/2, L/2, 0, L/2). That is, the processing image of the next higher level is obtained from the processing image of the lowest (pyramid base) processing image, as shown in FIG. 23.

Next, processing advances to step S96, where the variable L becomes ½ of its current value. In step S97, a judgment is made to determine whether or not the variable L is greater than 1. If the variable L is greater than 1, processing returns to step S92, and subsequent processing is executed again. That is, the image data of the third level will be obtained by this processing from the data of the second level.

Then, similar processing is executed again. When the variable L is not judged to be greater than 1 (that is, when the variable L is judged to be L=1) in step S97, pyramid filtering is terminated.

Figure 26:
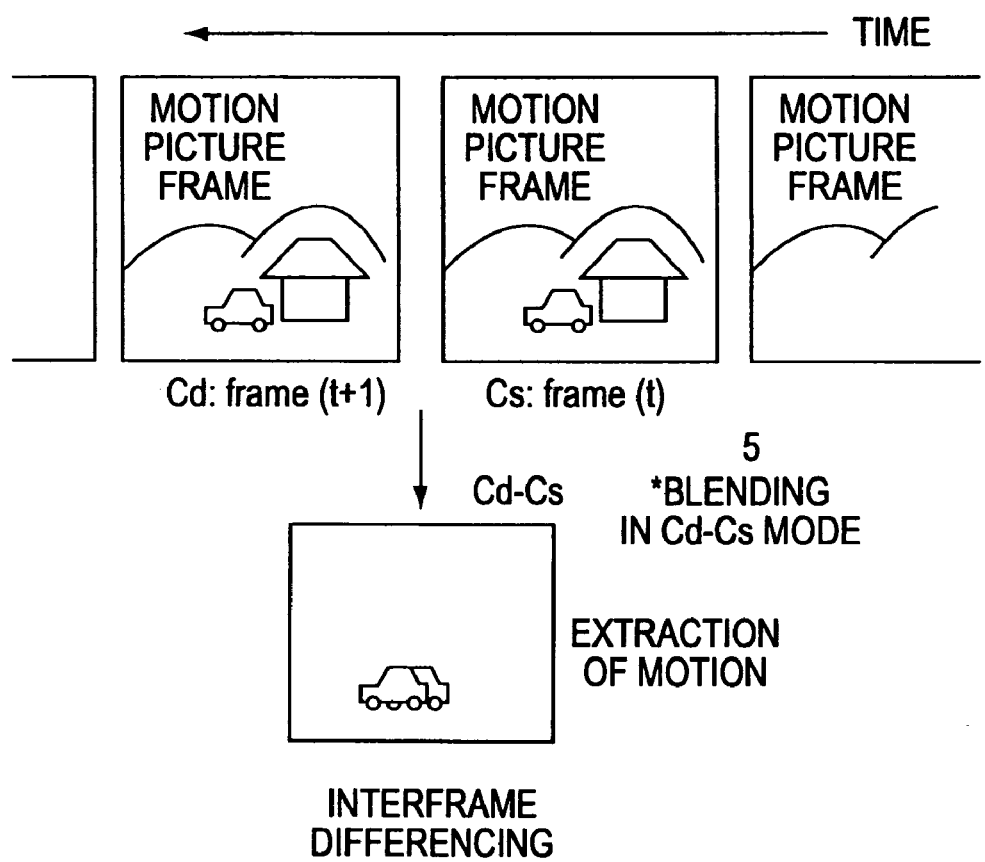
FIG. 26 is a diagram used to explain interframe differencing.

Here follows an explanation of interframe differencing. In interframe differencing, the difference of the image of the frame at time t and the image of the frame at time t+1 is computed, as shown in FIG. 26. This enables the area of the image containing movement to be extracted.

Figure 27:
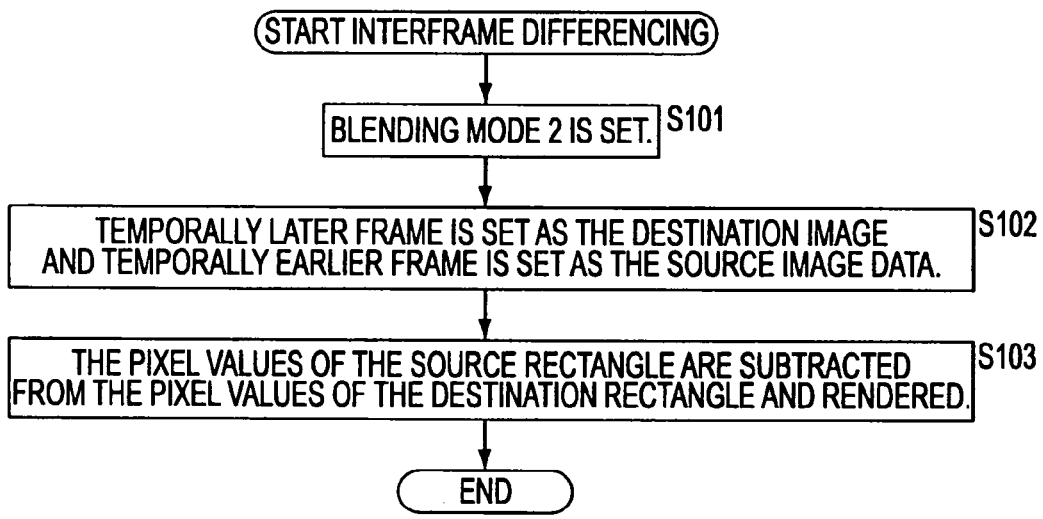
FIG. 27 is a flowchart used to explain interframe differencing.

In this case, main CPU 31 causes rendering engine 41 to execute the processing shown in the flowchart of FIG. 27. First, in step S101, rendering engine 41 sets mode 2 as the blending mode according to an instruction from main CPU 31. Next, in step S102, rendering engine 41 sets the image data of the temporally later frame as the destination image and sets the image data of the temporally earlier frame as the source image data. Then, in step S103, rendering engine 41 executes processing in which rendering is performed by subtracting the pixel values of the source rectangle from the pixel values of the destination rectangle. In a static image area, the pixel data of the destination frame and the pixel data of the source frame will essentially have the same values. As a result, when the processing is executed in step S103, the values of that pixel data will be practically 0.

In contrast, the values of pixel data in an area containing movement will differ in the destination and source. Therefore, the pixel data values obtained as a result of the processing in step S103 will have fixed nonzero sizes. Consequently, areas containing movement and areas containing static images can be distinguished from the size of each pixel data value of image data for which interframe differencing was performed.

Figure 28:
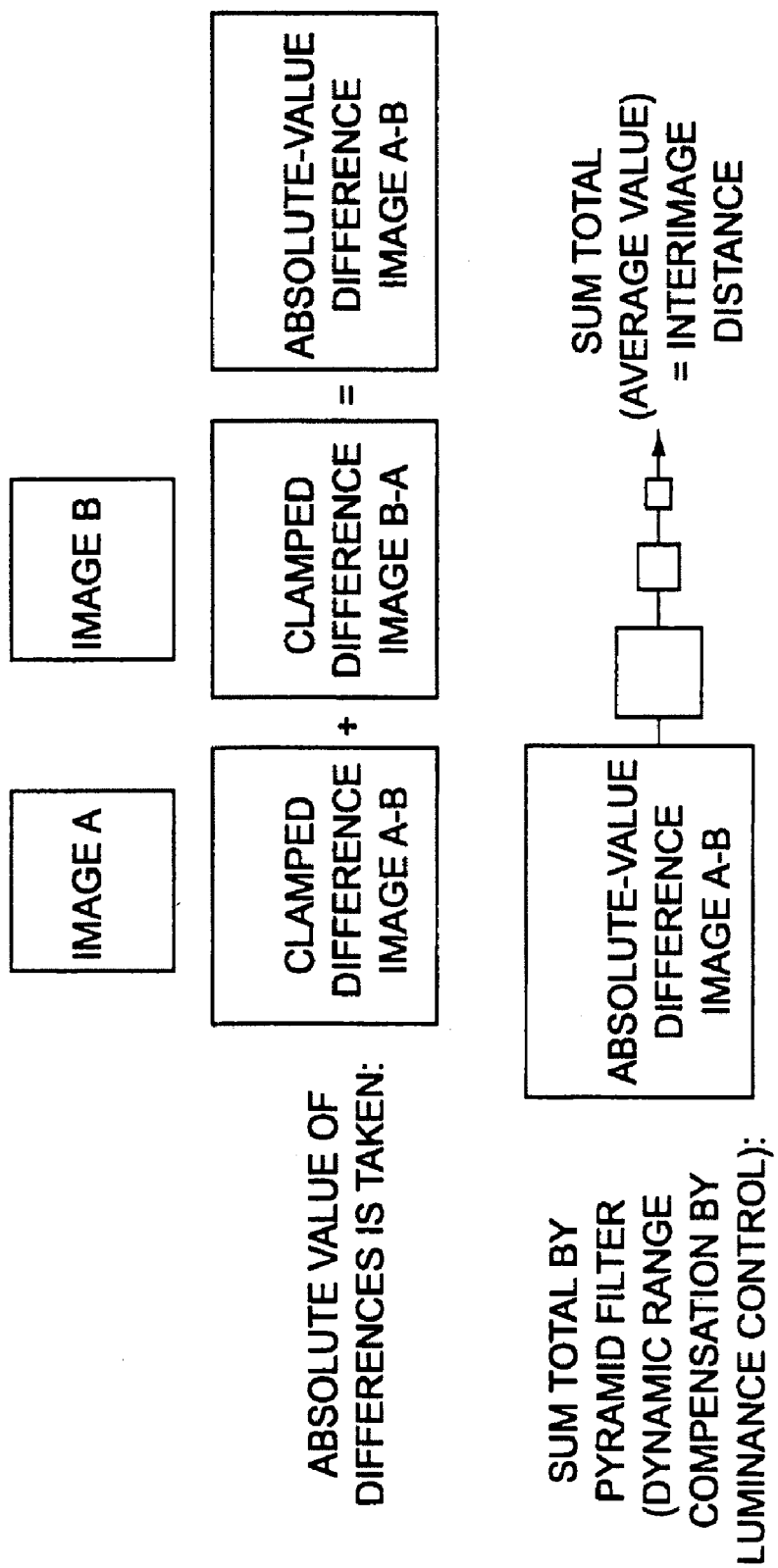
FIG. 28 is a diagram used to explain the interimage distance.

Here follows an explanation of interimage distance computation. The interimage distance represents the degree to which the images of the two frames indicated by image A and image B differ, as shown in FIG. 28. To obtain this interimage distance, processing for obtaining the difference image of image A and image B is executed with clamping. Clamping is a saturation process wherein values less than 0 are set to 0 and values greater than a maximum value are set to the maximum value. To obtain the interimage distance of image A and image B, clamped difference image data for which image B was subtracted from image A and clamped difference image data for which image A was subtracted from image B are obtained, and those are added to obtain the difference image data for which the absolute value has been taken.

For example, assume that the value of fixed pixel data of image A is 13 and the value of the corresponding pixel data of image B is 20. Then the value of A-B is −7, and the value when the result is clamped will be 0. Also, the value of B-A is 7. As a result, the value obtained by adding both of these will be 7.

When the difference image data for which the absolute value has been taken is obtained in this way, pyramid filtering of this data is executed next. When pyramid filtering is executed as described above, the value of the single pixel at the apex will be the average value of all of the pixels of the processing image (difference image for which the absolute value has been taken). Since this average value is the average of the absolute values of the difference of image A and image B, it can be considered as the interimage distance of image A and image B.

To obtain the interimage distance, main CPU 31 causes rendering engine 41 to execute processing like that shown in the flowchart of FIG. 24. First, in step S111, rendering engine 41 sets the first image (image A in FIG. 28) as the destination image and sets the second image (image B) as the source image. In step S112, rendering engine 41 sets the blending mode to mode 2. Next, in step S113, rendering engine 41 performs rendering by subtracting the pixel values of the source image (image B) from the pixel values of the destination image (image A) and executing clamping. As a result of this processing, the clamped difference image data of A-B is obtained in the first distance image area.

Next, in step S114, processing is executed in which the second image (image B) is set as the destination image and the first image (image A) is set as the source image. Next, in step S115, mode 2 is set as the blending mode. In step S116, processing is executed in which rendering is performed by subtracting the pixel values of the source image (image A) from the pixel values of the destination image (image B) and executing clamping. As a result of this processing, the clamped difference image data of B-A is obtained in the second distance image area.

Next, in step S117, rendering engine 41 sets the image of the first distance image area (clamped difference image of A-B) as the destination image and sets the image of the second distance image area (clamped difference image of B-A) as the source image. Then, in step S118, mode 1 is set as the blending mode. In step S119, processing is executed in which rendering is performed by adding the pixel values of the source image (clamped difference image of B-A) to the pixel values of the destination image (clamped difference image of A-B). As a result of this processing, the difference image data for which the absolute value has been taken is obtained.

Figure 29:
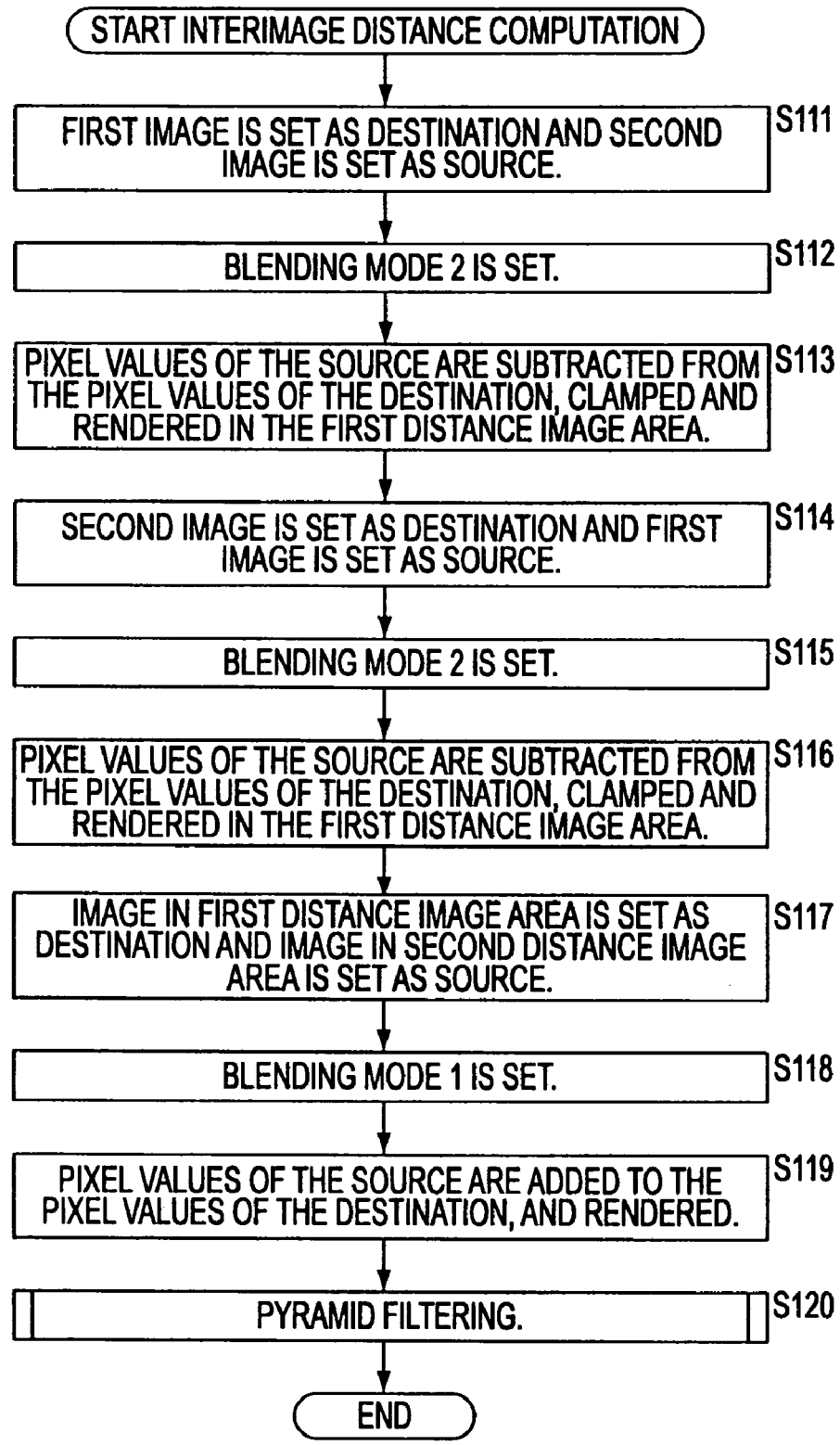
FIG. 29 is a flowchart used to explain interimage distance computation.

Next, in step S120, the interimage distance can be generated by applying to the absolute value for the difference image the pyramid filtering shown in FIG. 29.

Figure 30:
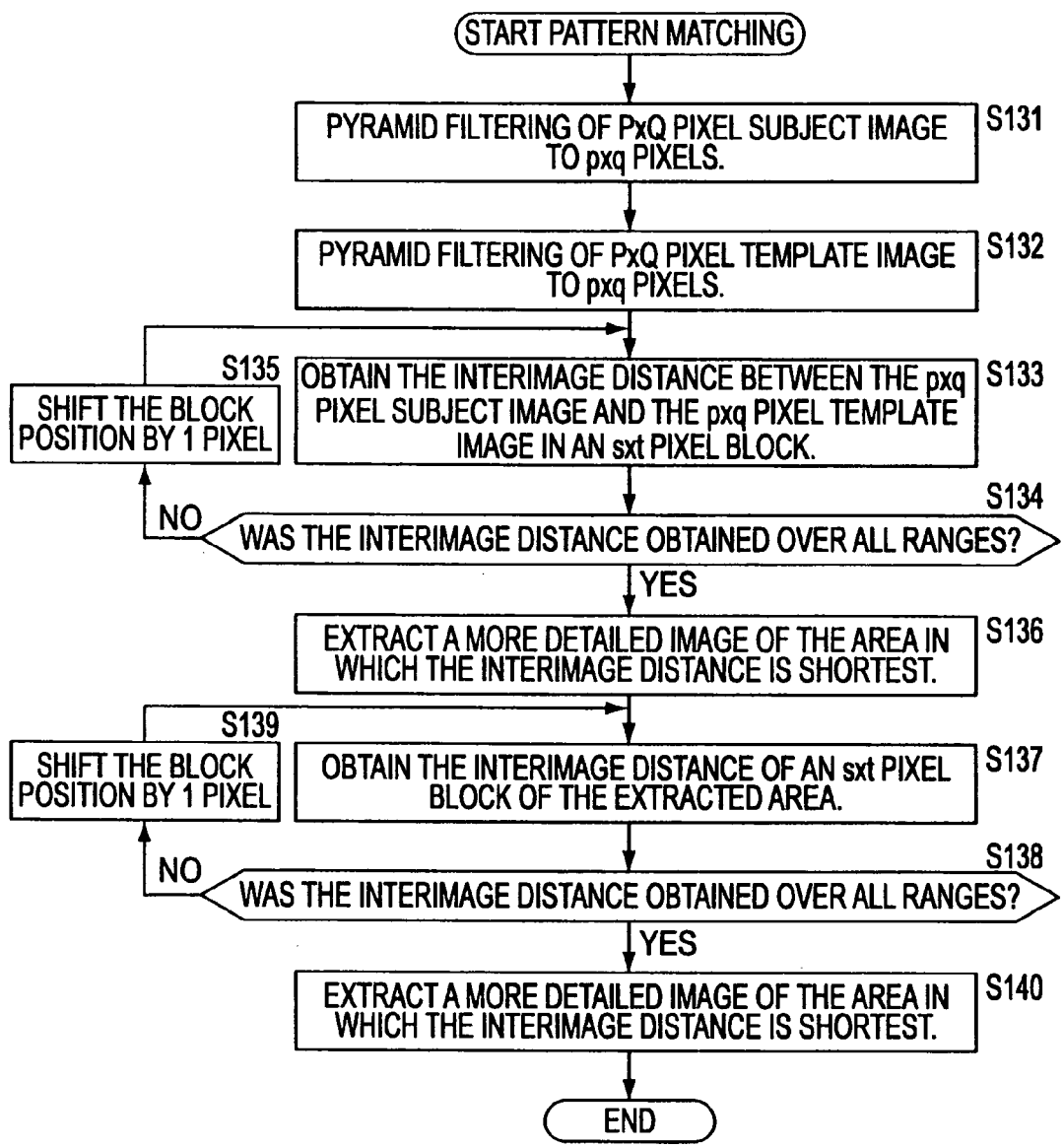
FIG. 30 is a flowchart used to explain pattern matching.

Here follows an explanation of pattern matching. To execute pattern matching of a subject image and template image when the template image size is large (for example, when it is equal to the subject image size), main CPU 31 causes rendering engine 41 to execute processing like that shown in the flowchart of FIG. 30, for example.

First, in step S131, rendering engine 41 reduces the P Q pixel subject image to p q pixels by executing pyramid filtering. Similarly, in step S132, rendering engine 41 reduces the P Q pixel template image to p q pixels by executing pyramid filtering.

Next, in step S133, rendering engine 41 obtains the interimage distance between the p q pixel subject image and the p q pixel template image in an s t pixel block. The interimage distance computation is performed as shown in the flowchart of FIG. 29, which was described above.

Next, in step S134, a judgment is made to determine whether or not the interimage distance has been obtained in all ranges. If there still exists a range for which the interimage distance has not been obtained, processing advances to step S135, where processing is executed for shifting the block position by one pixel. Then, processing returns to step S133, and similar processing is executed again.

If it is judged in step S134 that the interimage distance has been obtained in all ranges, processing advances to step S136. In step S136, main CPU 31 controls rendering engine 41, causing it to extract a more detailed image of the neighborhood of the area with the closest distance among the interimage distances that were obtained by repeatedly executing the processing of step S133.

Next, processing advances to step S137, where processing is executed for obtaining the interimage distance of an s t pixel block of the area that was extracted in step S136. In step S138, a judgment is made to determine whether or not the interimage distance has been obtained in all ranges. If there still exists a range for which the interimage distance has not been obtained, processing advances to step S139, where processing is executed for shifting the block position by one pixel. Then, processing returns to step S137, and similar processing is executed again.

If it is judged in step S138 that the interimage distance has been obtained in all ranges, processing advances to step S140 wherein the block corresponding to the one with the closest distance among the multiple interimage distances that were obtained by repeatedly executing the processing of step S137 is extracted.

The processing described above is performed when the template image size is relatively large compared with the subject image size. However, if the template is sufficiently small compared with the subject image, pattern matching can be performed as shown in the flowchart of FIG. 31.

Figure 32:
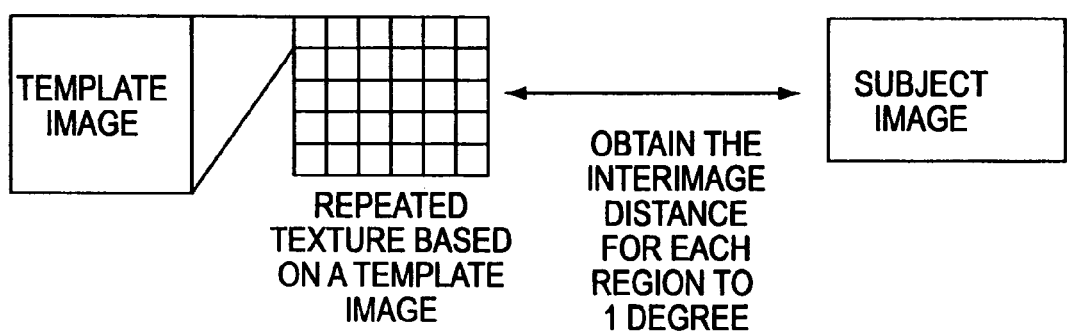
FIG. 32 is a diagram used to explain pattern matching.

In this case, in step S151, the subject image is selected as the first image. Then, in step S152, rendering engine 41 generates the second image by arranging multiple instances of the relatively small template, as shown in FIG. 32. In step S153, processing is executed for computing the interimage distance of the subject image that was selected in step S151 and the template image that was generated in step S152. This interimage distance computation is executed in a similar manner as that shown in the flowchart of FIG. 29. However, in this embodiment, since the second image is generated by arranging multiple instances of the template, as shown in FIG. 32, the interimage distance is computed in units of this template.

Figure 31:
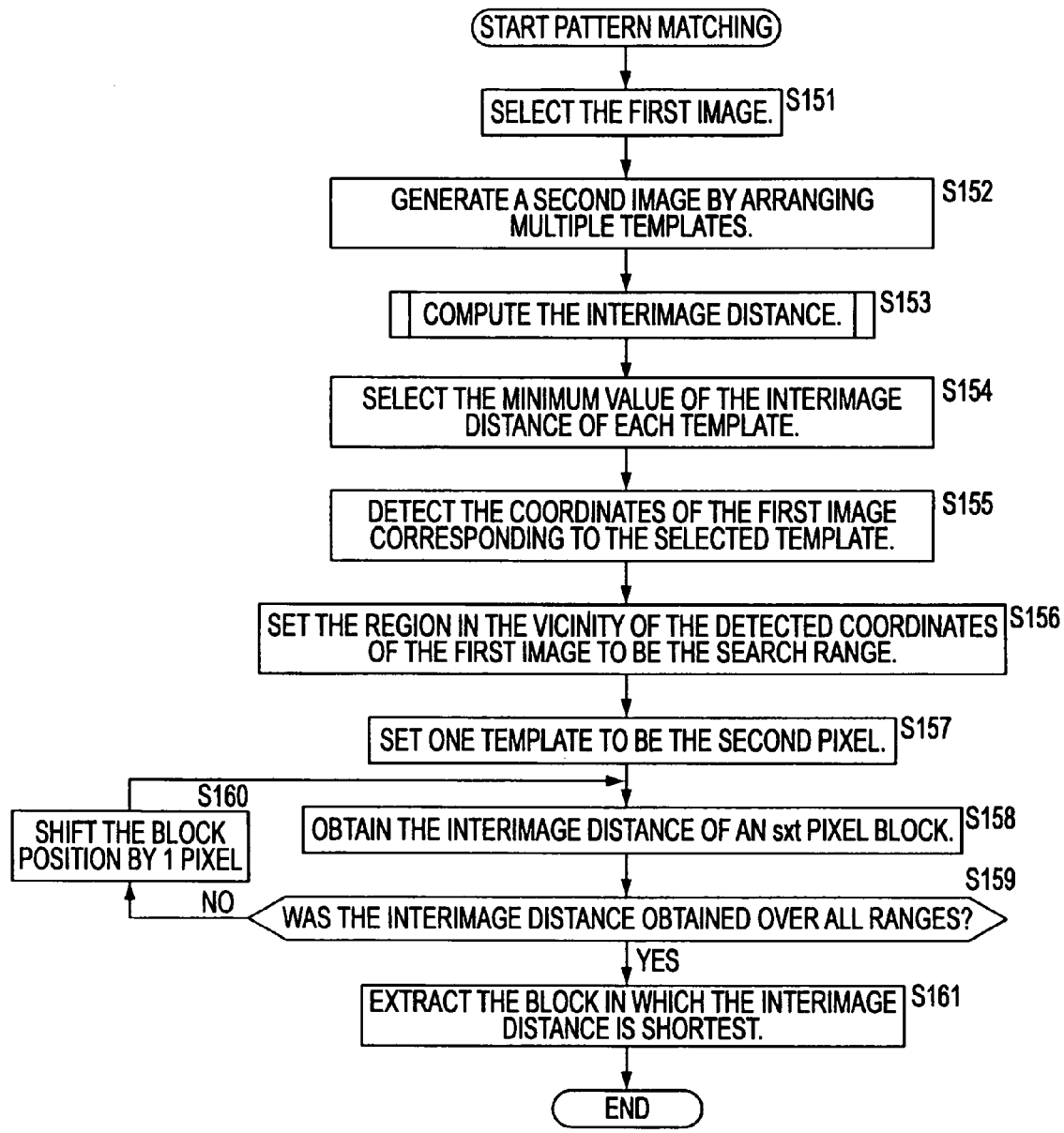
FIG. 31 is a flowchart used to explain another example of pattern matching.

In step S159 of FIG. 31, a judgment is made to determine whether or not the interimage distance has been obtained in all search ranges. If there still exists a range for which the interimage distance has not been obtained, processing advances to step S160, where the position of the second image is shifted by one pixel. Then, processing returns to step S158, and the subsequent processing is executed again. In step S154 the minimum value of the interimage distance of each template is selected. In step S155 the coordinates of the first image corresponding to the selected template are detected. In step S156 the region in the vicinity of the detected coordinates of the first image is set to be the search range. In step S157 one template is set to be the second pixel. In step S158 the interimage distance of an sxt pixel block is obtained. Then the process is advanced to step S159 as explained above.

If it is judged in step S159 that the interimage distance has been obtained in all search ranges, processing advances to step S161 wherein the block with the closest interimage distance among the multiple interimage distances that were obtained by repeatedly executing the processing of step S158 is extracted.

Figure 33:
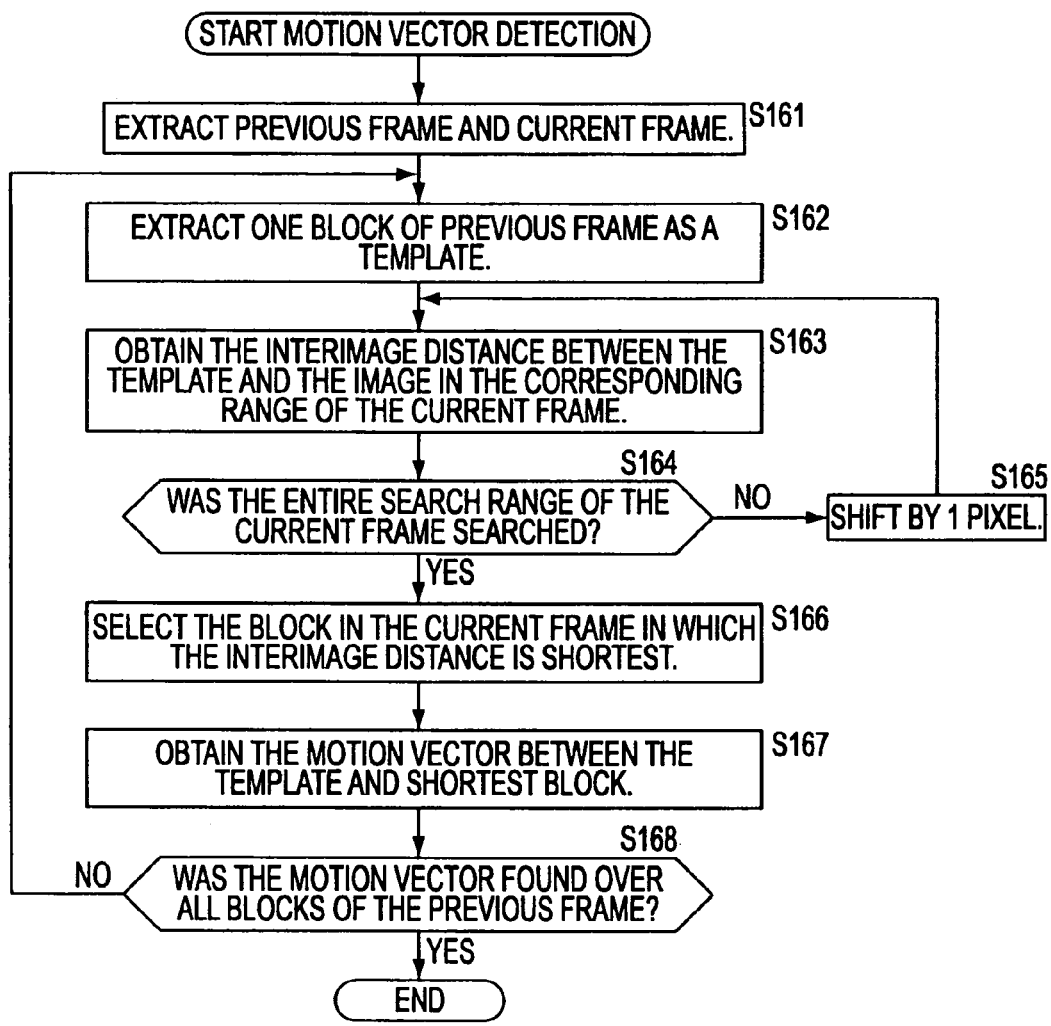
FIG. 33 is a flowchart used to explain a motion vector detection process.
Figure 34:
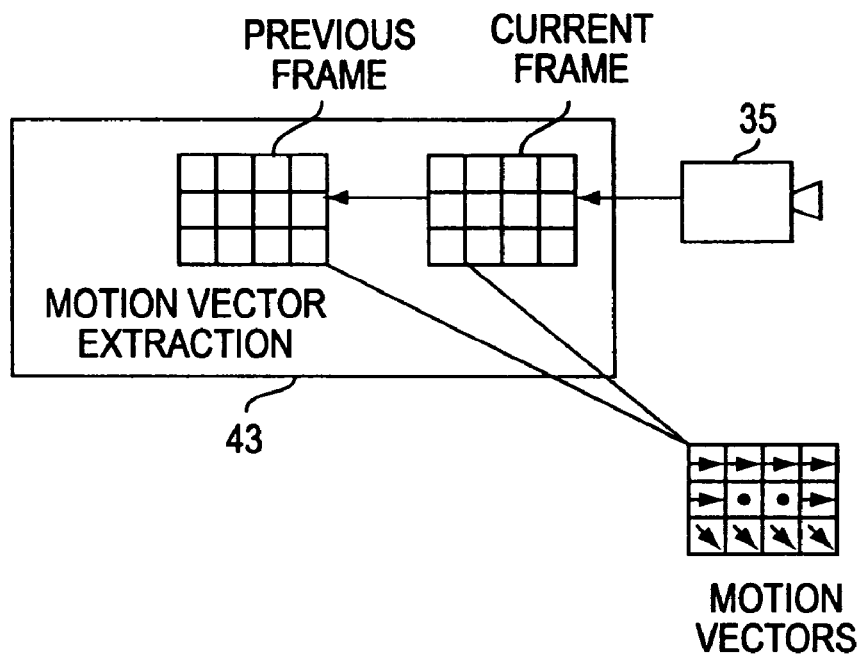
FIG. 34 is a diagram used to explain the process of extracting motion vectors.
Figure 35:
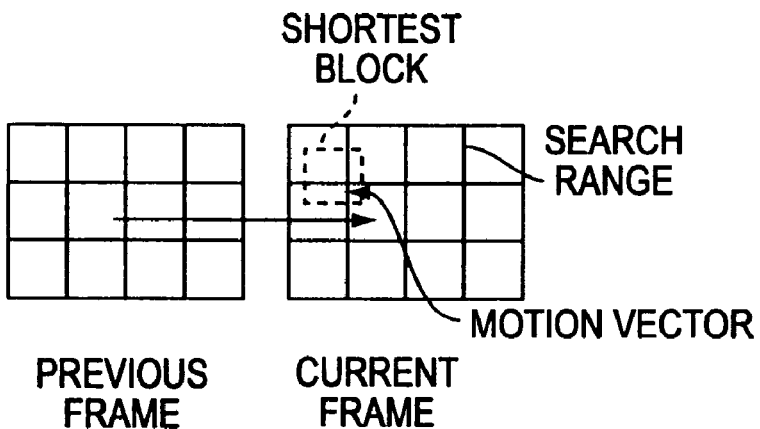
FIG. 35 is a diagram used to explain the process of obtaining motion vectors by shifting a block within a search range.

FIG. 33 shows an example of processing for detecting motion vectors. First, in step S161, PCRTC 44 causes the previous frame image and the current frame image, which were output from video camera 35, to be stored in image memory 43, as shown in FIG. 34. Next, processing advances to step S162, where main CPU 31 extracts one block of the previous frame image as the template. Then, in step S163, main CPU 31 executes processing for obtaining the interimage distance of the template that was extracted in step S162 and the image (block) of the corresponding range of the current frame, as explained in the flowchart of FIG. 29.

Next, in step S164, main CPU 31 judges whether or not all search ranges of the current frame have been searched. If there still exists a range that has not been searched, processing advances to step S165, where the position of the image (block) of the corresponding range of the current frame is shifted by one pixel. Then, processing returns to step S163, where processing for obtaining the interimage distance of the template image and the image of the block of the current frame is executed again.

The processing described above is repeatedly executed until it is judged in step S164 that all search ranges have been searched. When it is judged in step S164 that all search ranges have been searched, processing advances to step S166, where main CPU 31 obtains the closest interimage distance from among the multiple interimage distances that were obtained by repeatedly executing the processing of step S163 and selects the corresponding block in the current frame as the closest block. Then, in step S167, main CPU 31 obtains the motion vector between the template and the closest block that was selected in step S166.

Next, in step S168, main CPU 31 judges whether or not motion vectors have been obtained for all blocks of the previous frame. If there still remains a block for which the motion vector has not been obtained, processing returns to step S162, where main CPU 31 extracts a new block from the previous frame as the template, and similar processing is executed again.

If it is judged in step S168 that motion vectors have been obtained for all blocks of the previous frame, processing is terminated.

Figure 38:
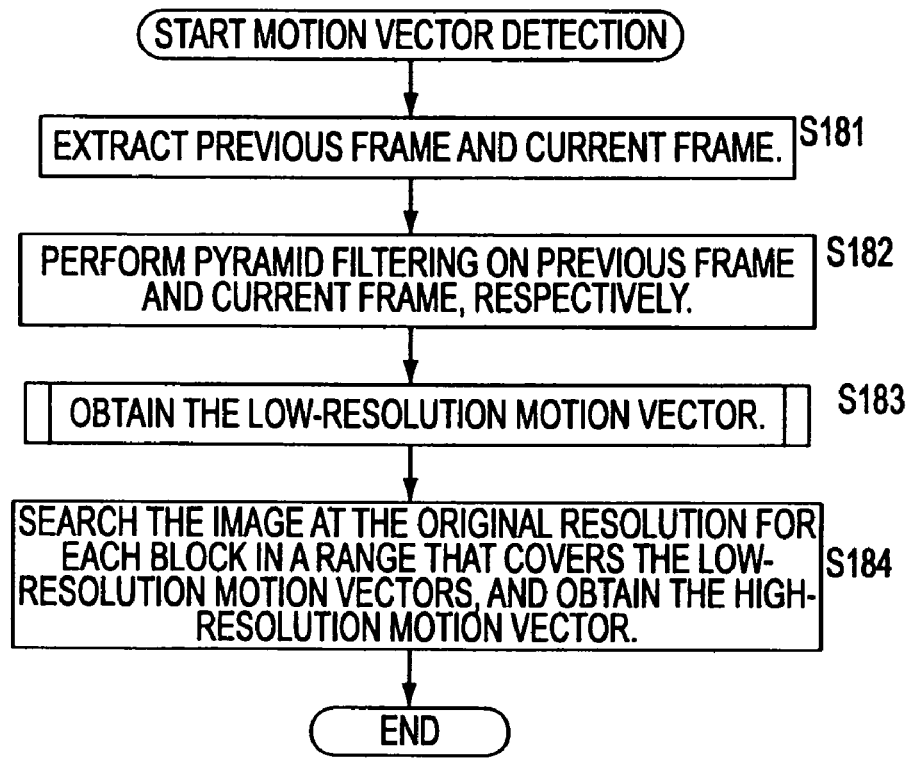
FIG. 38 is a flowchart used to explain still another motion vector detection process.

Although motion vectors can be obtained as described above, they can also be obtained as shown in FIG. 36, for example. In this example, in step S171, the previous frame image and the current frame image, which were output from video camera 35, are stored in image memory 43. Next, in step S172, the interimage distances of each block of the previous frame and current frame are obtained simultaneously, as shown in FIG. 38.

In step S173, main CPU 31 judges whether or not the position of the current frame has been shifted relative to the previous frame in the entire search range. If there still remains an unshifted current frame position within the entire search range, processing advances to step S174, where main CPU 31 executes processing for shifting the position of the current frame relative to the previous frame by one pixel. Then, processing returns to step S172, and processing for simultaneously obtaining the interimage distance of each block of the previous frame and current frame is executed again.

The processing described above is repeatedly executed until it is judged in step S173 that the current frame has been shifted in the entire search range. Each time the processing of step S172 is executed, the number of interimage distances that are obtained is equal to the total number of blocks. Therefore, in step S173, when the judgment is made that the current frame has been shifted in the entire search range, the number of interimage distances that have been obtained will be equal to the number of pixels in the search range multiplied by the number of blocks.

In step S175, the closest interimage distance among the pixel-count number of interimage distances within the search range is selected for a single block, and the block in the current frame that corresponds to that closest interimage distance is selected as the closest block. Similar processing is executed for all of the blocks. Then, in step S176, the motion vector of the closest block, which was obtained in step S175, and the previous frame is obtained for each block.

Obtaining the motion vectors in this way enables the motion vectors to be obtained quicker than by the method shown in FIG. 33.

Obtaining the motion vectors as shown in the flowchart of FIG. 38 also enables them to be obtained quicker than by the method shown in FIG. 33.

Figure 39:
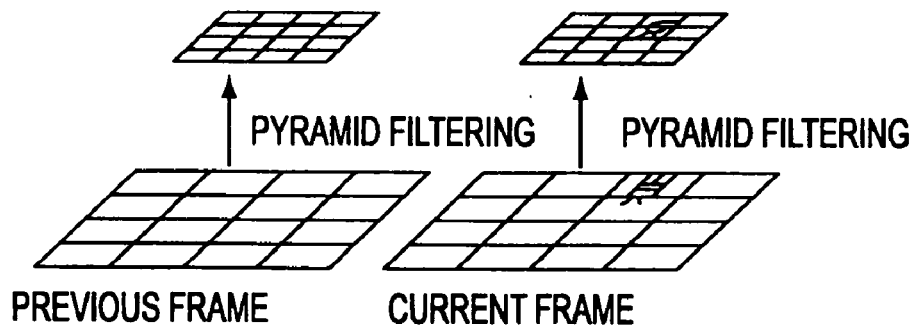
FIG. 39 is a diagram used to explain the pyramid filtering process in step S182 of FIG. 38.

In the example shown in FIG. 38, in step S181, the previous frame image and the current frame image, which were output from video camera 35, are stored in image memory 43. Next, processing advances to step S182, where main CPU 31 creates low resolution image data by executing pyramid filtering on the previous frame and the current frame, respectively, as shown in FIG. 39. This pyramid filtering is executed as explained for the flowchart in FIG. 24.

Figure 36:
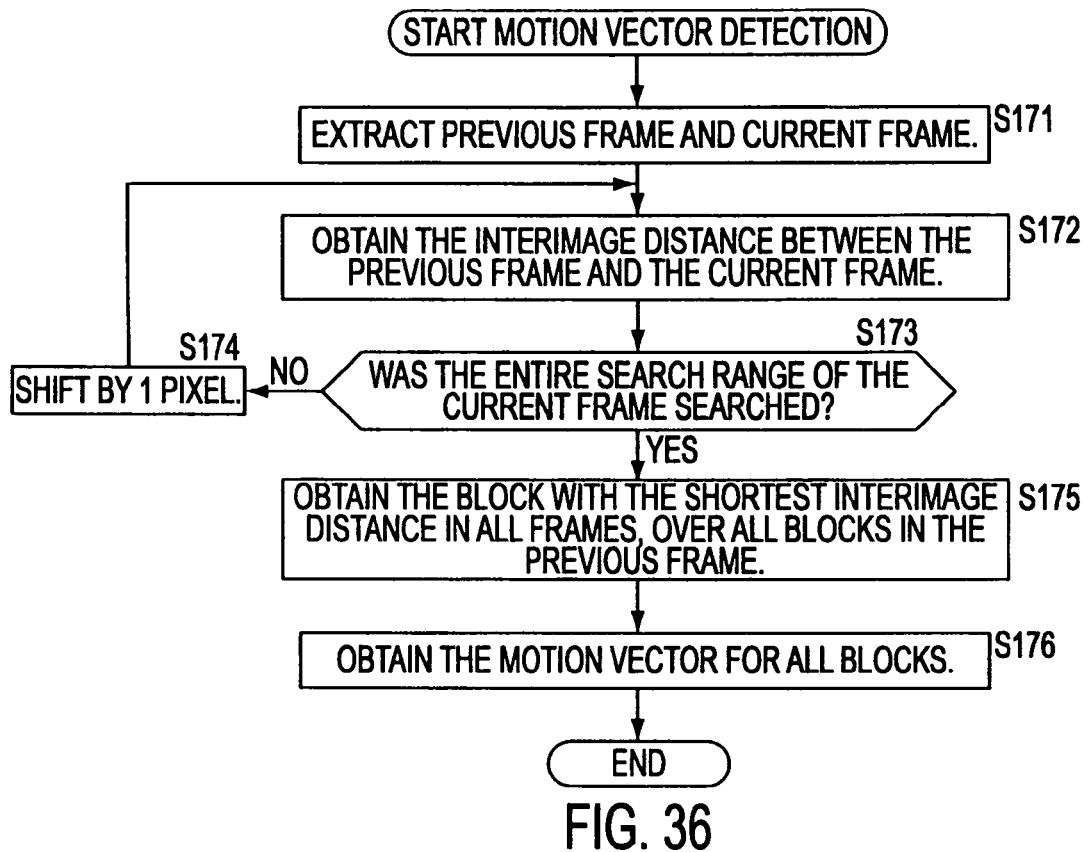
FIG. 36 is a flowchart used to explain another motion vector detection process.
Figure 37:
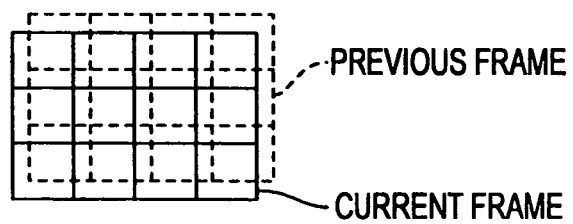
FIG. 37 is a diagram used to explain the process of obtaining the interimage distance in step S172 of FIG. 36.

Next, in step S183, main CPU 31 executes processing for obtaining low precision motion vectors by using the low resolution image data that was obtained in step S182. This processing for obtaining the motion vectors is executed as explained for FIG. 33 or FIG. 36. When the low precision motion vectors have been obtained in step S183, processing advances to step S184. In step S184, main CPU 31 executes processing for obtaining high precision motion vectors by searching the range covered by the low precision motion vectors, for each block, based on the original resolution (before pyramid filtering was performed) image data. This processing for obtaining the motion vectors is also executed as shown in FIG. 33 or FIG. 36.

Here follows an explanation of a Hough transformation. A Hough transformation, which is processing for transforming a straight line to a point, is defined as follows.

$$Ah(\rho,\theta)=\iint A(x,y)\delta(\rho-x\cos\theta-y\sin\theta)dxdy \quad (14)$$

The above equation can be transformed as follows.

$$Ah(\rho,\theta)=\int A(p\cos\theta-t\sin\theta, \rho\sin\theta-t\cos\theta)dt \quad (15)$$

Figure 40:
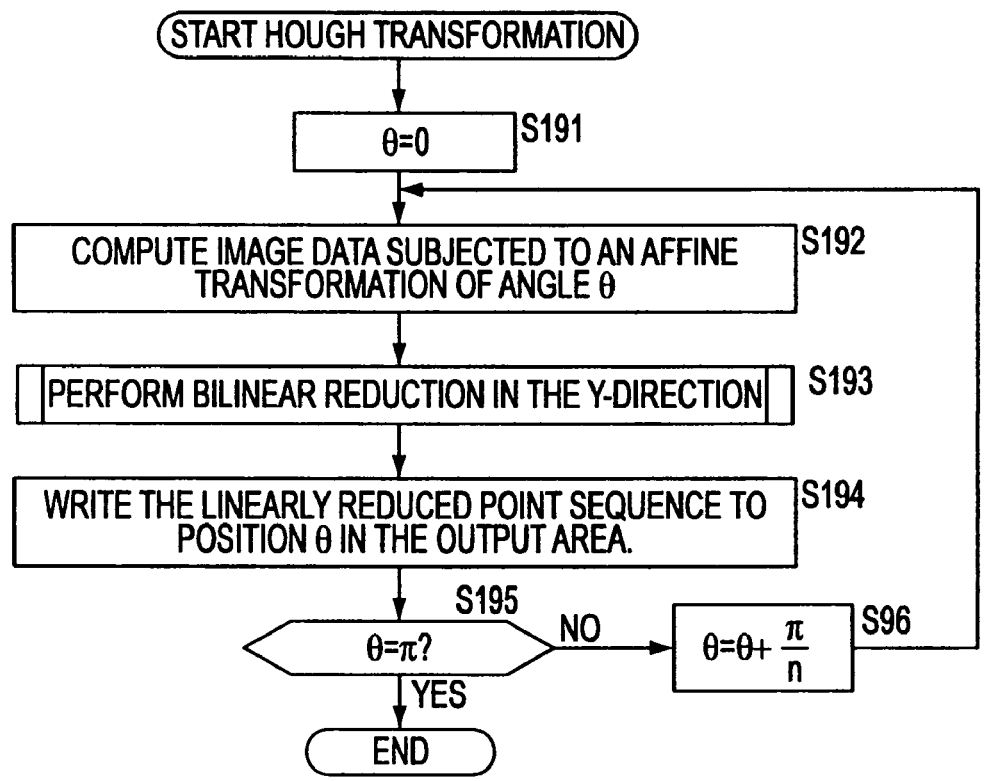
FIG. 40 is a flowchart used to explain Hough transformation.
Figure 41:
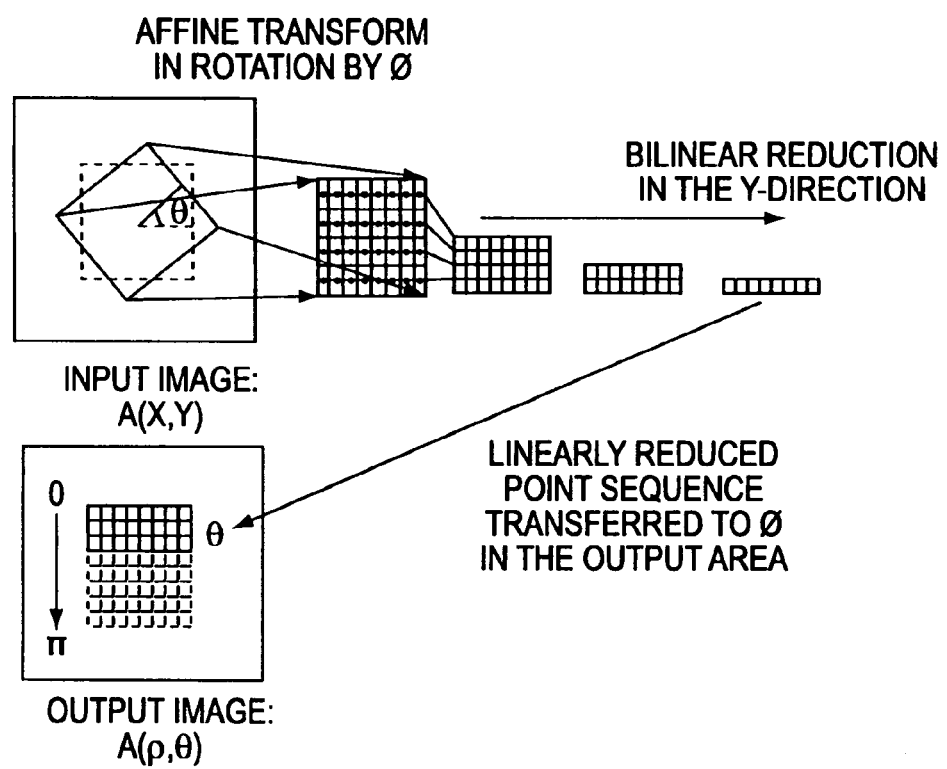
FIG. 41 is a diagram used to explain Hough transformation.

FIG. 40 represents an example of processing in which rendering engine 41 executes a Hough transformation. First, in step S191, θ is initialized to 0. This θ represents the rotation angle of the input image, as shown in FIG. 41. In step S192, image data is computed by applying an affine transformation of angle θ to the input image. This angle θ defines the coefficients a to d in equation (11) described above.

Next, processing advances to step S193, where bilinear reduction in the y-direction is executed. Details about this bilinear reduction in the y-direction are described later for the flowchart in FIG. 42. This processing causes the input image that had been rotated by the angle θ to be expressed as a single straight line in the y-direction, as shown by a typical example in FIG. 41.

Next, processing advances to step S194. In step S194, processing is executed in which the point sequence that had been linearly reduced in step S193 is written at the position corresponding to the angle θ in rendering area 52.

Next, in step S195, a judgment is made to determine whether or not θ is equal to π. If it is not equal to π, processing advances to step S196, where θ is incremented by π/n. Then, processing returns to step S192, and the subsequent processing is executed again. When the judgment is made in step S195 that θ is equal to π, processing is terminated.

For example, if the angular resolution is π/n, this processing enables a Hough transformation to be performed on a 64×64 pixel image by using at most 6n polygons. Also, if the angular resolution is π/n, a Hough transformation can be performed on 256×256 pixel image data by using at most 8n polygons.

Here follows an explanation of the processing details for performing the bilinear reduction in the y-direction in step S193 of FIG. 40. To cause rendering engine 41 to execute this processing, main CPU 31 supplies the following kinds of commands, for example, to rendering engine 41.

int L; /* Length of one side of source area */
int offset;
L=2N^, /* Length of one side initial image *
offset=0;
while (L>1){
   Set Texture Base (0, offset); /* Set base point of texture area */
   offset+=L;
Set Drawing Base (0, offset); /* Set base point of rendering area */
   Flat Texture Rectangle (0, 0, L0, L/2, 0, L/2, 0, 0.5, L0, 0.5, L0, L+0.5, 0, L+0.5, 1.0):
   L=L/2;
}

Figure 42:
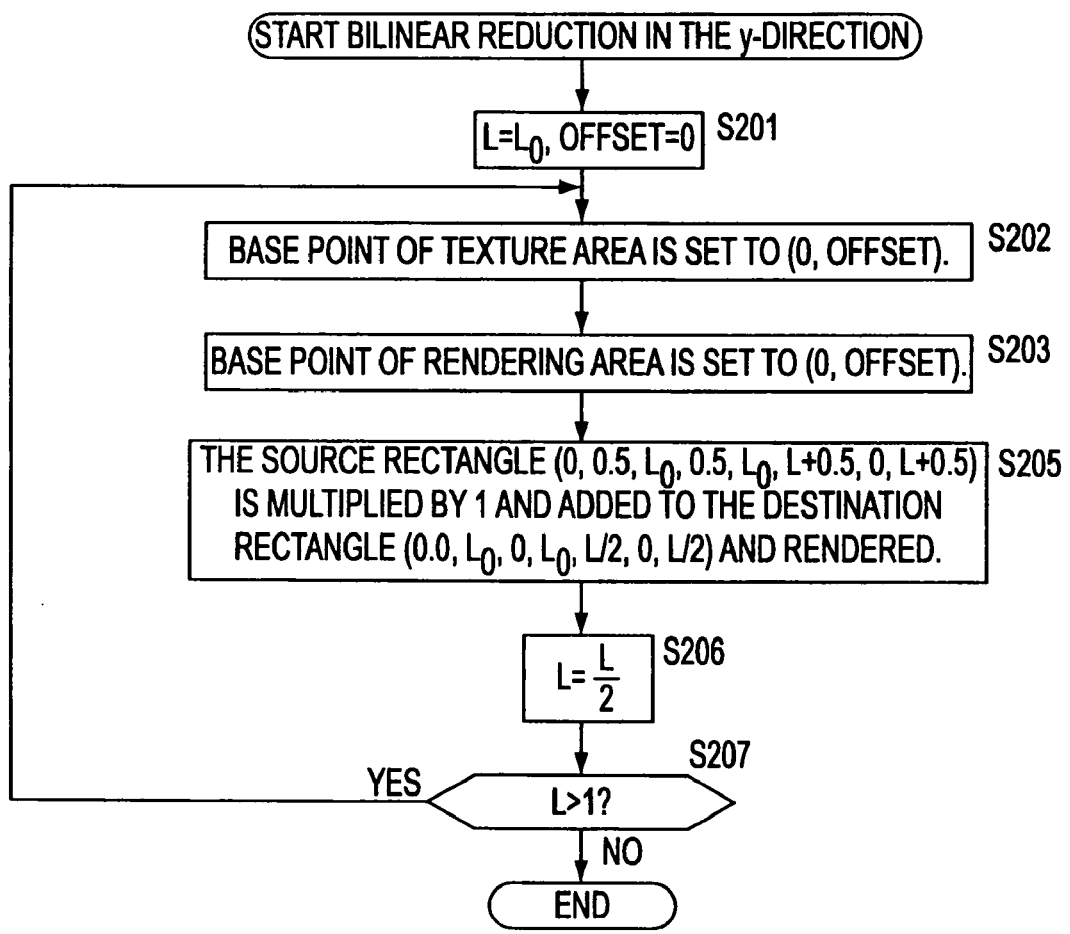
FIG. 42 is a flowchart used to explain bilinear reduction in the y direction in step S193 of FIG. 40.
Figure 43:
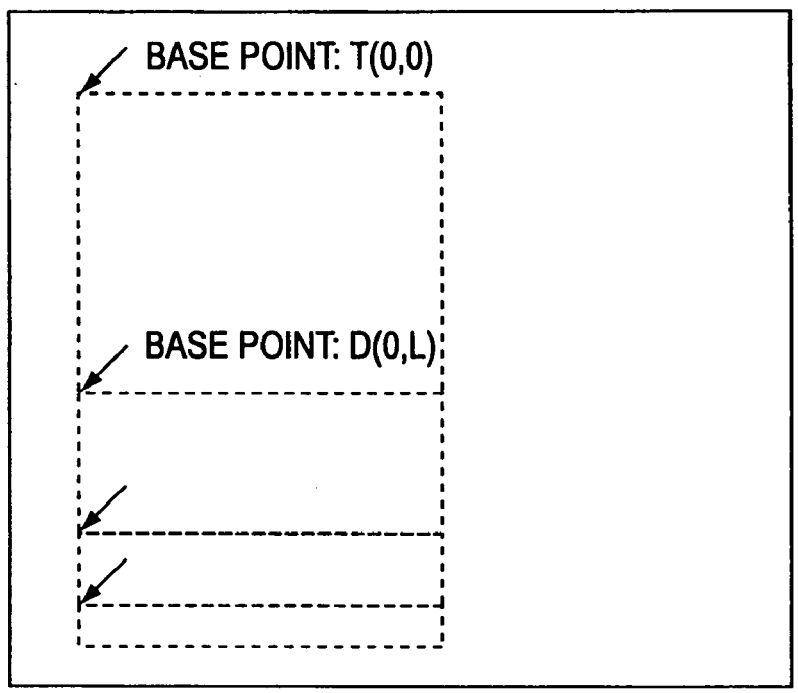
FIG. 43 is a diagram used to explain the processing of steps S202 and S204 of FIG. 42.

FIG. 42 shows this processing represented as a flowchart. First, in step S201, the variable L is initialized to $L_0$ and the variable offset is initialized to 0. Next, in step S202, processing is executed in which (0,offset) is set for the base point of texture area 51. That is, the base point T(0,0) is set, as shown in FIG. 43. Next, processing advances to step S203, where the variable offset is incremented by L. Then, in step S204, (0,offset) is set for the base point of rendering area 52. At this time, the base point D(0,L) is set, as shown in FIG. 38.

Next, in step S205, processing is executed in which rendering is performed by multiplying 1 by the pixel values of the source (texture) rectangle (0, 0.5, $L_0$, 0.5, $L_0$, L+0.5, 0, L+0.5) and adding the result to the destination rectangle (0, 0, $L_0$, 0, $L_0$, L/2, 0, L/2).

Next, processing advances to step S206, where the variable L becomes ½ of its current value. In step S207, a judgment is made to determine whether or not the variable L is greater than 1. If the variable L is greater than 1, processing returns to step S202, and subsequent processing is executed again.

Then, similar processing is repeatedly executed. When the variable L is not judged to be greater than 1 (that is, when the variable L is judged to be L=1) in step S207, bilinear reduction in the y-direction is terminated.

Figure 44:
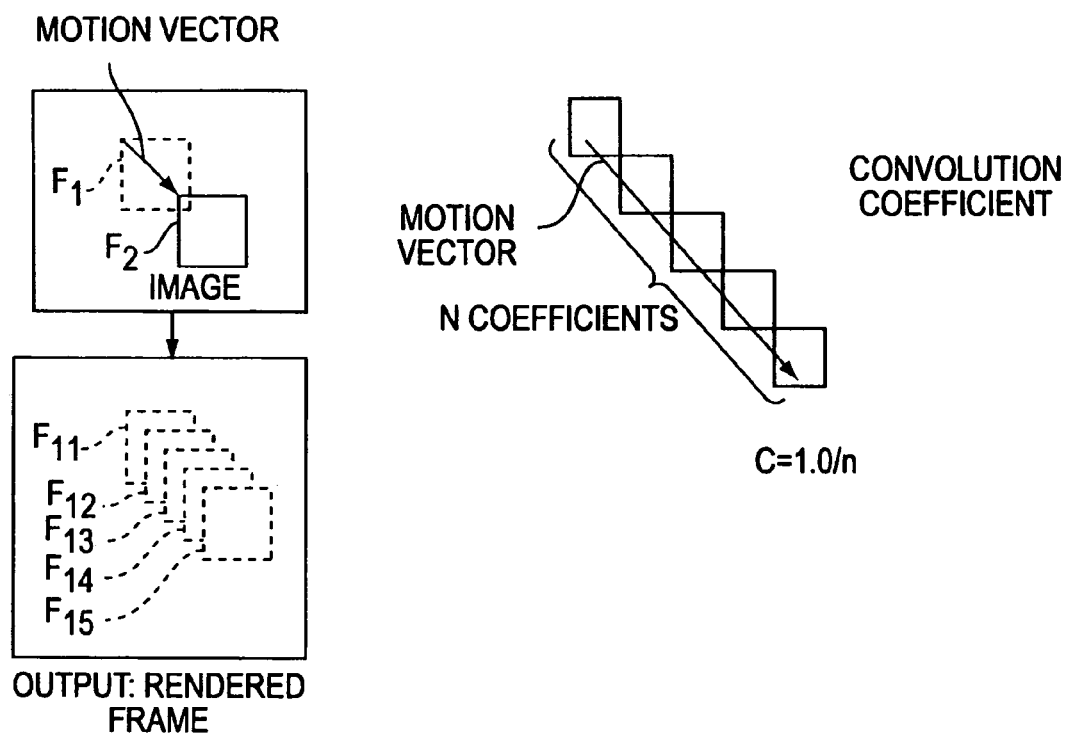
FIG. 44 is a diagram used to explain motion blurring.

Here follows an explanation of motion blurring. If motion has occurred between the previous frame $F_1$ and the current frame $F_2$, as shown in FIG. 44, a motion vector exists between them. When the image is captured by using a CCD with an electronic shutter, the image is captured without blur even for a rapidly moving object. When the movement is fast (that is, when the motion vector value is large), if frame $F_2$ is directly displayed after frame $F_1$, the image may not appear to be moving smoothly because there is no image blur. In this situation, n convolution coefficients (the value of convolution coefficient C is assumed to be 1.0/n) are set along the motion vector to generate an image in which n images are superimposed. For example, in FIG. 39, since n=5 has been assumed, an image in which frames $F_{11}$ to $F_{15}$ have been superimposed is output after the previous frame $F_1$ instead of the current frame $F_2$. This enables the user to perceive the image as a smoothly moving image. This processing is called motion blurring.

Figure 45:
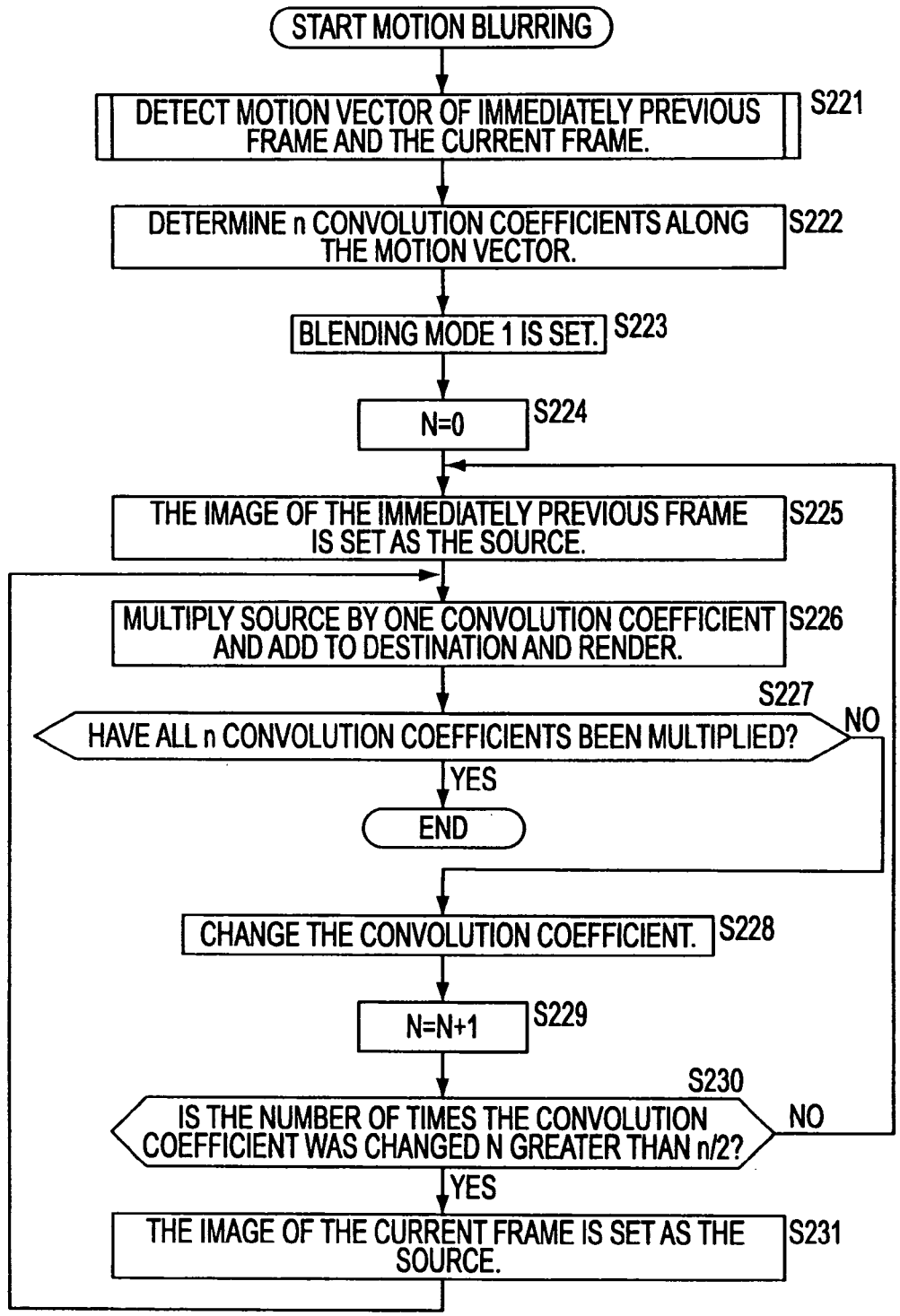
FIG. 45 is a flowchart used to explain motion blurring.
Figure 46:
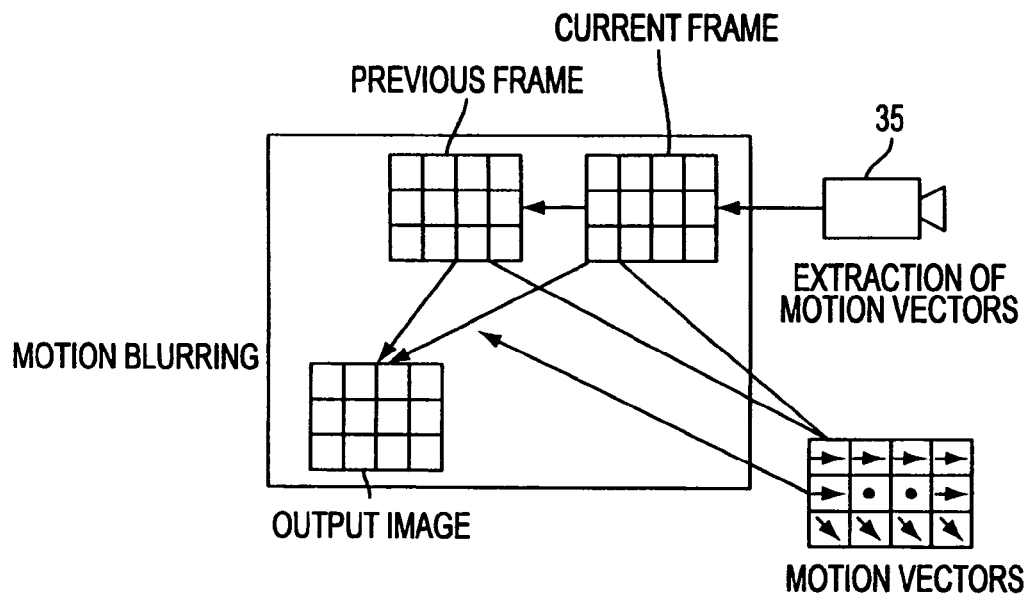
FIG. 46 is a diagram used to explain the compensation of motion pictures from a CCD camera with an electronic shutter.

Here follows an explanation of motion blurring that is performed by rendering engine 41 as shown in the flowchart of FIG. 45. First, in step S221, processing is executed for detecting motion vectors from the previous frame and current frame. That is, for example, processing is executed for extracting motion vectors from the images of the current frame and its preceding frame among the images that were output from video camera 35, which has built-in CCDs with electronic shutters, as shown in FIG. 46. Next, in step S222, n convolution coefficients C are determined along the motion vectors. As described above, the values of these convolution coefficients C will be 1/n when the number of frames to be interpolated is n.

Next, in step 223, mode 1 is set as the blending mode. In step S224, the variable N, which indicates the number of times the convolution coefficients are to be changed, is initialized to 0. Next, in step S225, the previous frame image is set as the source image. In step S226, processing is executed in which rendering is performed by multiplying one convolution coefficient by the source and adding the result to the destination.

Next, processing advances to step S227, where a judgment is made to determine whether or not all of the n convolution coefficients have been multiplied. If there still exists a convolution coefficient that has not been multiplied, processing advances to step S228, where processing for changing the convolution coefficients is executed. Then, in step S229, the variable N, which indicates the number of times the convolution coefficients are to be changed, is incremented by 1.

In step S230, a judgment is made to determine whether or not the variable N, which is the number of times the convolution coefficients are to be changed, is greater than n/2. If the variable N is less than n/2, processing returns to step S225, and the subsequent processing is executed again.

If the variable N is judged to be greater than n/2 in step S230, processing advances to step S231, where the image of the current frame is set as the source frame. Then, processing returns to step S226, and the subsequent processing is executed again.

In step S227, when all of the n convolution coefficients have been multiplied, processing is terminated.

Figure 47:
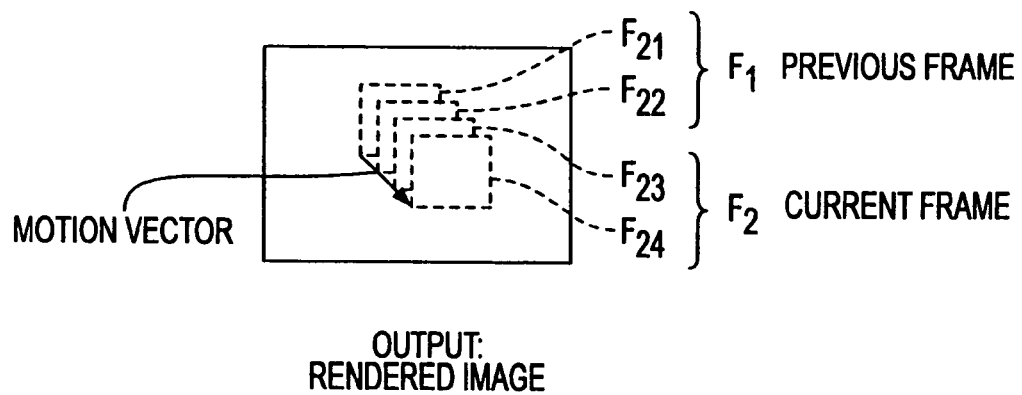
FIG. 47 is a diagram used to explain motion blurring.

If there are 4 (n=4) convolution filter coefficients, as shown in FIG. 47, frames $F_{21}$ and $F_{22}$ (frames that are generated by the first and second renderings), which are close to the previous frame $F_1$, are generated based on the previous frame $F_1$, and frames $F_{23}$ and $F_{24}$ (frames generated by the third and fourth renderings) are generated based on the current frame $F_2$ since they are close to the current frame $F_2$. In this case, since the direction of the motion vector is opposite the natural direction, rendering is executed so that this fact is taken into account.

Since the motion vectors exist in units of macro blocks, as shown in FIG. 46, motion blurring is executed in units of macro blocks.

Figure 48:
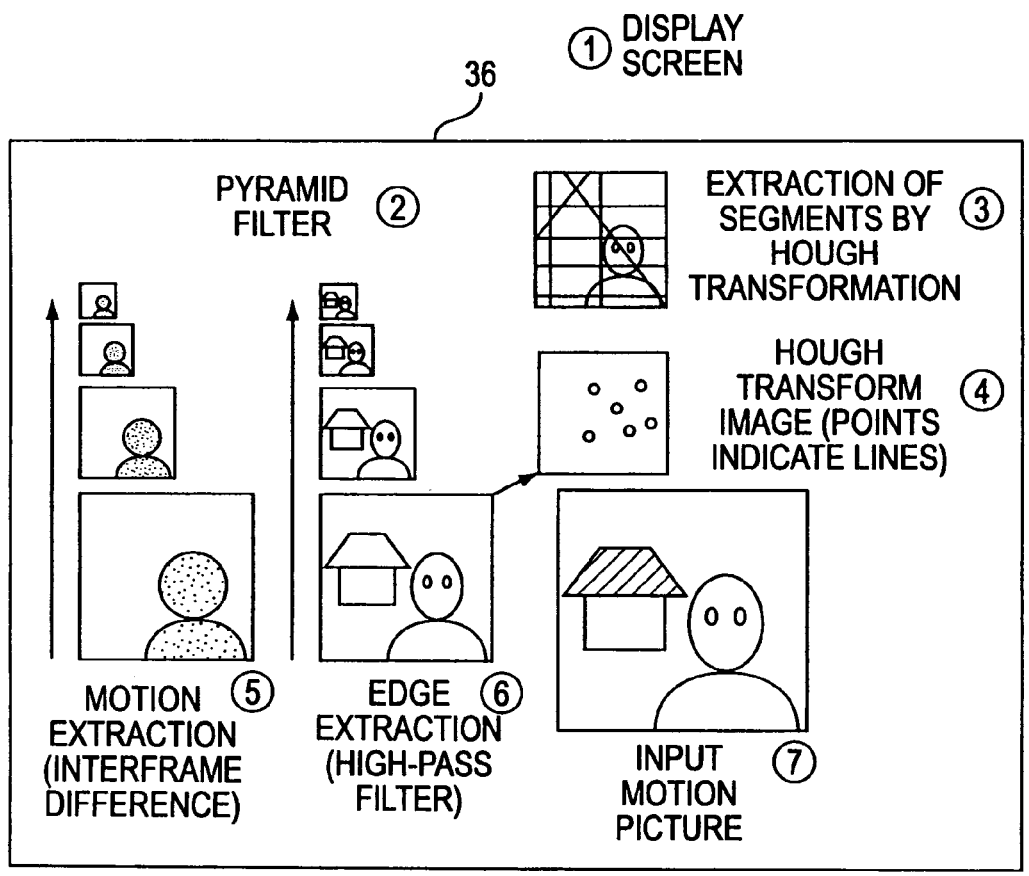
FIG. 48 is a diagram showing an example of an image display.
Figure 49:
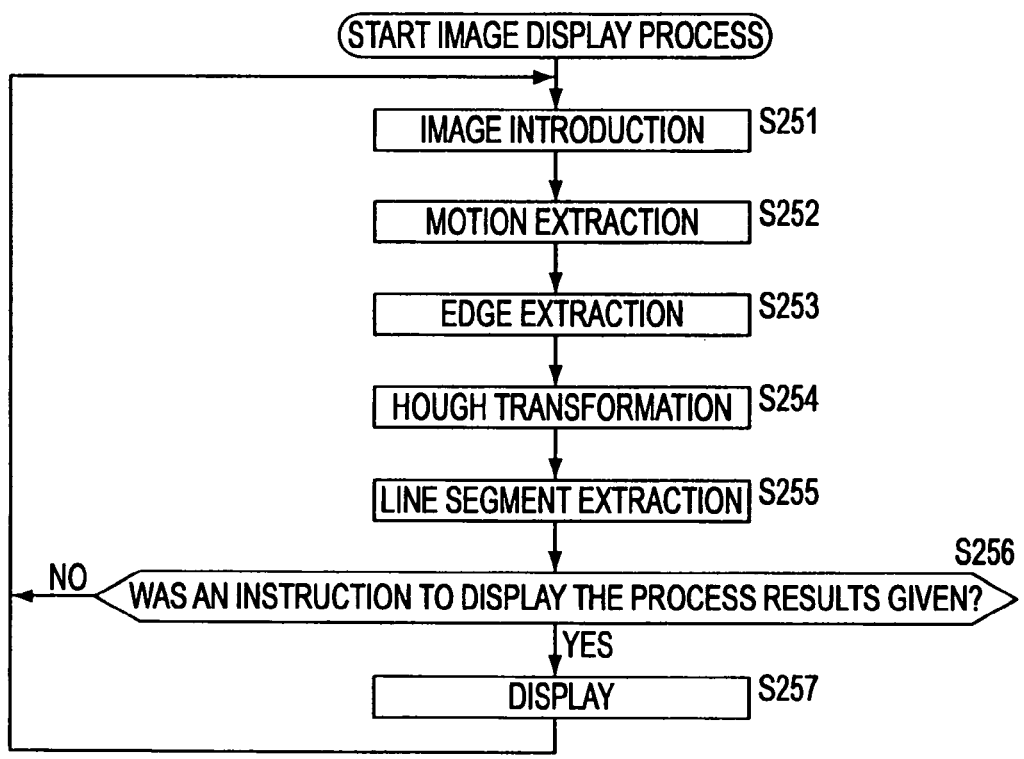
FIG. 49 is a flowchart used to explain the image display process.

By causing rendering engine 41 to execute the various types of processing described above, the processing results can be displayed on CRT 36, as shown in FIG. 48, for example. In this case, main CPU 31 executes processing like that shown in the flowchart of FIG. 49.

In step S251, main CPU 31 takes the video images that were input from video camera 35 via PCRTC 44 and memory interface 42 and stores them in image memory 43.

Next, in step S252, main CPU 31 controls rendering engine 41 to make it execute interframe differencing (motion extraction) as explained for the flowchart in FIG. 27.

Next, in step S253, main CPU 31 controls rendering engine 41 to make it execute edge extraction. Edge extraction is performed by setting values like those shown in FIG. 50 as the convolution filter coefficients for the convolution filtering explained in FIG. 12.

Next, processing advances to step S254, where main CPU 31 controls rendering engine 41 to make it execute a Hough transformation as explained in the flowchart of FIG. 40. Then, in step S255, main CPU 31 controls rendering engine 41 to make it execute line segment extraction based on the Hough transformation that was executed in step S254.

In step S256, a judgment is made to determine whether or not the user instructed that the processing result of steps S252 to S255 be displayed. If no instruction was issued, processing returns to step S251, and the subsequent processing is executed again. If it is judged in step S256 that the user instructed that the processing result be displayed, processing advances to step S257. In step S257, main CPU 31 controls PCRTC 44 so that PCRTC 44 reads the image that has been rendered in image memory 43 via memory interface 46 and outputs that image to CRT 36 for display. As a result, the image is displayed on CRT 36, as shown in FIG. 48, for example.

In the display example in FIG. 48, the image of the interframe differencing (motion extraction), which is performed in step S252, is displayed at the left side, and the image of the edge extraction, which is performed in step 5253, is displayed to the right of the interframe differencing image.

Then, to the right of the edge extraction image, the input image, which was introduced in step S251, is displayed at the bottom, the image of the Hough transformation (output image of Ah( , ) in FIG. 41), which is performed in step S254, is displayed above the input image, and the result of the line segment extraction (line segments that were extracted by the Hough transformation), which is performed in step S255, is displayed above the Hough transformation image.

In the above, the present invention was explained using the case of its application in a computer entertainment device as an example. However, the present invention can also be applied in other image processing devices.

In this Specification, "system" refers to the entire apparatus consisting of multiple individual devices.

Note that the distribution medium used to distribute to users the computer program that performs the processing as described above may be magnetic disk, CD-ROM, solid-state memory or other storage media, or a network, satellite or other communications medium may be used.

As described above, with the image processing device, the image processing process and the distribution medium of the present invnention, the action of applying a stipulated pixel-unit operation and rendering the data in the second storage means in units of polygons is performed repeatedly until a stipulated arithmetic result is obtained, so it is possible to perform image processing with a low-cost device having a simple construction.

Also with the image processing device, the image processing method and the distribution medium of the present invention, there are generated rendering commands that cause the action of applying a stipulated pixel-unit operation and rendering the data in units of polygons to be performed repeatedly until a stipulated arithmetic result is obtained, so rendering commands are used to permit the stipulated operations to be executed.

With the image processing device of the present invention one portion of the operations among some stipulated pixel-unit operations are performed and the data is rendered in the second storage means in units of polygons, and then another portion of the operations among some stipulated pixel-unit operations are performed and this data is added to or subtracted from the image data and the data is rendered in units of polygons, so by means of the rendering process, various operations can be performed rapidly.

In order to clarify the correspondence between the various means of the invention recited in the claims, here follows a description of the characteristics of the present invention with the addition of the corresponding embodiment (one example)

in parentheses after each means. However, this recitation in no way limits the recitation of the various means.

The image processing device of the present invention comprises a first storage means (for example, texture area 51 in FIG. 7) that stores source image data in units of pixels; a second storage means (for example, rendering area 52 in FIG. 7) that stores destination image data in units of pixels; and a rendering means (for example, rendering engine 41 in FIG. 6) that performs the action of applying a stipulated pixel-unit operation to the source image data stored in the first storage means and rendering the data as destination image data in the second storage means in units of polygons repeatedly until a stipulated arithmetic result is obtained.

The image processing device further comprises specification means (for example, main CPU 31 in FIG. 6) for specifying the operation mode between source image data and destination image data.

The image processing device comprises storage means (for example, image memory 43 in FIG. 6) including a first storage unit (for example, texture area 51 in FIG. 7) that stores source image data in units of pixels and a second storage unit (for example, rendering area 52 in FIG. 7) that stores destination image data in units of pixels; a generation means (for example, main CPU 31 in FIG. 6) that generates rendering commands that cause the action of applying a stipulated pixel-unit operation to the source image data stored in the first storage unit and rendering the data as destination image data in the second storage unit in units of polygons to be performed repeatedly until a stipulated arithmetic result is obtained; and an execution means (for example, rendering engine 41 in FIG. 6) that executes rendering commands generated by the generation means.

The image processing device as described above comprise a first storage means (for example, texture area 51 in FIG. 7) that stores source image data in units of pixels; a second storage means (for example, rendering area 52 in FIG. 7) that stores destination image data in units of pixels; a first rendering means (for example, steps S37, S38, and S39 in FIG. 12) that performs one portion of the operations among some stipulated pixel-unit operations to the source image data stored in the first storage means and renders the data as destination image data in the second storage means in units of polygons; and a second rendering means (for example, steps S37, S40, and S41 in FIG. 12) that performs another portion of the operations among some stipulated pixel-unit operations to the source image data stored in the first storage means, adds or subtracts this data to or from the image data already rendered by the first rendering means and renders the data as destination image data in the second storage means in units of polygons.

The image processing device may further comprise specification means (for example, step S34 in FIG. 12) for specifying the operation mode between the source image data and destination image data.

What is claimed is:

1. An image processing device comprising:
   first storage means for storing source image data in units of pixels;
   second storage means for storing destination image data in units of pixels;
   rendering means for performing an action of applying a stipulated pixel-unit operation to the source image data stored in said first storage means and rendering the data as destination image data in the second storage means in units of polygons repeatedly until a stipulated arithmetic result is obtained; and
   means for specifying an operation mode between said source image data and said destination image data,
   wherein said means for specifying specifies as said operation mode either a first mode wherein said source image data is added to said destination image data, or a second mode wherein said source image data is subtracted from said destination image data.

2. The image processing device recited in claim 1, wherein the source image data stored in said first storage means is image data output from a video camera.

3. The image processing device recited in claim 1, wherein said means for specifying further specifies as said operation mode a third mode wherein said source image data is stored as said destination image data in said second storage means.

4. The image processing device recited in claim 1, wherein said stipulated operation is one of convolution filtering, pyramid filtering, interframe differencing, interimage distance computation, Hough transformation, motion blurring or bilinear interpolation.

5. The image processing device recited in claim 1, wherein said image processing device is a computer entertainment device.

6. An image processing method in an image processing device including:
   first storage means that stores source image data in units of pixels, and second storage means that stores destination image data in units of pixels comprising:
   the image processing method comprising:
   a rendering step wherein the action of applying a stipulated pixel-unit operation to the source image data stored in said first storage means and rendering the data as destination image data in the second storage means in units of polygons is performed repeatedly until a stipulated arithmetic result is obtained; and
   a specifying step of specifying an operation mode between said source image data and said destination image data by specifying as said operation mode either a first mode wherein said source image data is added to said destination image data, or a second mode wherein said source image data is subtracted from said destination image data.

7. A distribution medium used in an image processing device including a first storage means that stores source-image image data in units of pixels, and a second storage means that stores destination image data in units of pixels;
   said distribution medium is used to distribute a program that executes processing comprising:
   a rendering step wherein an action of applying a stipulated pixel-unit operation to the source image data stored in said first storage means and rendering the data as destination image data in the second storage means in units of polygons is performed repeatedly until a stipulated arithmetic result is obtained; and
   a specifying step of specifying an operation mode between said source image data and said destination image data by specifying as said operation mode either a first mode wherein said source image data is added to said destination image data, or a second mode wherein said source image data is subtracted from said destination image data.

8. An image processing device comprising:
   storage means comprising a first storage unit that stores source image data in units of pixels and a second storage unit that stores destination image data in units of pixels;
   a generation means that generates rendering commands that cause the action of applying a stipulated pixel-unit operation to the source image data stored in said first storage means and rendering the data as destination image data in the second storage means in units of polygons to be performed repeatedly until a stipulated arithmetic result is obtained;

an execution means that executes rendering commands generated by said generation means; and means for specifying an operation mode between said source image data and said destination image data, wherein said means for specifying specifies as said operation mode either a first mode wherein said source image data is added to said destination image data, or a second mode wherein said source image data is subtracted from said destination image data.

9. The image processing device recited in claim 8, wherein the source image data stored in said first storage means is image data output from a video camera.

10. The image processing device recited in claim 8, wherein said means for specifying further specifies as said operation mode a third mode wherein said source image data is stored as said destination image data in said second storage means.

11. The image processing device recited in claim 8, wherein said stipulated operation is selected from the group consisting of convolution filtering, pyramid filtering, interframe differencing, interimage distance computation, Hough transformation, motion blurring and bilinear interpolation.

12. The image processing device recited in claim 8, wherein said image processing device is a computer entertainment device.

13. An image processing method in an image processing device which has storage units that store image data, comprising:

a storage step wherein source image data is stored in a first storage unit in units of pixels and also destination image data is stored in a second storage unit in units of pixels; and a generation step of generating rendering commands that cause the action of applying a stipulated pixel-unit operation to the source image data stored in said first storage means in said storage step and rendering the data as destination image data in the second storage means in units of polygons to be performed repeatedly until a stipulated arithmetic result is obtained; and a specifying step of specifying an operation mode between said source image data and said destination image data by specifying as said operation mode either a first mode wherein said source image data is added to said destination image data, or a second mode wherein said source image data is subtracted from said destination image data.

14. A distribution medium used in an image processing device that has storage units that store image data, to distribute a program that executes processing, the distribution medium comprising:

a storage step wherein source image data is stored in a first storage unit in units of pixels and also destination image data is stored in a second storage unit in units of pixels;

a generation step of generating rendering commands that cause the action of applying a stipulated pixel-unit operation to the source image data stored in said first storage unit in said storage step and rendering the data as destination image data in the second storage unit in units of polygons to be performed repeatedly until a stipulated arithmetic result is obtained; and a specifying step of specifying an operation mode between said source image data and said destination image data by specifying as said operation mode either a first mode wherein said source image data is added to said destination image data, or a second mode wherein said source image data is subtracted from said destination image data.

15. An image processing device comprising:

a first storage means that stores source image data in units of pixels;

a second storage means that stores destination image data in units of pixels;

a first rendering means that performs one portion of the operations among some stipulated pixel-unit operations to the source image data stored in said first storage means and renders the data as destination image data in the second storage means in units of polygons; and a second rendering means that performs another portion of the operations among some stipulated pixel-unit operations to the source image data stored in said first storage means, adds or subtracts this data to or from the image data already rendered by said first rendering means and renders the data as destination image data in the second storage means in units of polygons.

16. The image processing device recited in claim 15, wherein the source image data stored in said first storage means is image data output from a video camera.

17. The image processing device recited in claim 15, and further comprising specification means for specifying the operation mode between said source image data and said destination image data.

18. The image processing device recited in claim 17, wherein said specification means specifies as said operation mode either a first mode wherein said source image data is added to said destination image data, or a second mode wherein said source image data is subtracted from said destination image data.

19. The image processing device recited in claim 18, wherein said specification means further specifies as said operation mode a third mode wherein said source image data is stored as said destination image data in said second storage means.

20. The image processing device recited in claim 15, wherein said stipulated operation is selected from the group consisting of convolution filtering, pyramid filtering, interframe differencing, interimage distance computation, Hough transformation, motion blurring or bilinear interpolation.

21. The image processing device recited in claim 15, wherein said image processing device is a computer entertainment device.

22. An image processing method in an image processing device including a first storage means that stores source image data in units of pixels, and a second storage means that stores destination image data in units of pixels, the image processing method comprising:

a first rendering step wherein one portion of the operations among some stipulated pixel-unit operations are performed on the source image data stored in said first storage means and the data is rendered as destination image data in the second storage means in units of polygons; and a second rendering step wherein another portion of the operations among some stipulated pixel-unit operations are performed on the source image data stored in said first storage means, this data is added to or subtracted from the image data already rendered in said first rendering step and the data is rendered as destination image data in the second storage means in units of polygons.

23. The image processing method recited in claim 22, wherein said stipulated pixel unit operations are selected from the group consisting of convolution filtering, pyramid filtering, interframe differencing, interimage distance computation, Hough transformation, motion blurring and bilinear interpolation.

24. The image processing method recited in claim 22, wherein the source image data is stored as the destination image data in the second rendering step.

25. A distribution medium used in an image processing device including a first storage means that stores source image data in units of pixels, and a second storage means that stores destination image data in units of pixels, the distribution medium being used to distribute a program that executes processing comprising:

a first rendering step wherein one portion of the operations among some stipulated pixel-unit operations are performed on the source image data stored in said first storage means and the data is rendered as destination image data in the second storage means in units of polygons; and a second rendering step wherein another portion of the operations among some stipulated pixel-unit operations are performed on the source image data stored in said first storage means, this data is added to or subtracted from the image data already rendered in said first rendering step and the data is rendered as destination image data in the second storage means in units of polygons.

26. The distribution medium in claim 25, wherein said stipulated pixel unit operations are selected from the group consisting of convolution filtering, pyramid filtering, interframe differencing, interimage distance computation, Hough transformation, motion blurring and bilinear interpolation

27. The distribution medium in claim 25, wherein the source image data is stored as the destination image data in the second rendering step.

* * * * *